US012801617B2

(12) United States Patent
Amadieu et al.

(10) Patent No.: US 12,801,617 B2
(45) Date of Patent: Nov. 17, 2026

(54) SMART POLLING

(71) Applicant: AMADEUS S.A.S., Biot (FR)

(72) Inventors: Olivier Amadieu, Roquefort Les Pins (FR); Guillaume Le Grand, Le Cannet (FR); Yannick Devaux, Mougins (FR); Jean-Marie Cazorla, Opio (FR); Krishna Padmanabhan, Bengaluru (IN)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 19/180,431

(22) Filed: Apr. 16, 2025

(65) Prior Publication Data

US 2026/0064704 A1 Mar. 5, 2026

(30) Foreign Application Priority Data

Apr. 19, 2024 (EP) .................................... 24315198

(51) Int. Cl.
*G06F 16/2458* (2019.01)
*G06F 16/2453* (2019.01)

(52) U.S. Cl.
CPC .... *G06F 16/2471* (2019.01); *G06F 16/24539* (2019.01)

(58) Field of Classification Search
CPC ...................... G06F 16/2471; G06F 16/24539
See application file for complete search history.

(56) References Cited

U.S. PATENT DOCUMENTS

| | | | | |
|---|---|---|---|---|
| 8,779,981 B2 * | 7/2014 | Eisen | G01S 5/06 342/465 |
| 8,838,657 B1 * | 9/2014 | Malone | G06F 16/93 707/790 |
| 8,943,313 B2 * | 1/2015 | Glew | G06F 21/87 726/1 |
| 10,375,646 B2 * | 8/2019 | Manepalli | H04W 76/28 |
| 10,401,943 B2 * | 9/2019 | Cronin | H04W 52/0254 |
| 10,901,993 B2 * | 1/2021 | Canis | G06F 16/24552 |
| 11,636,112 B2 * | 4/2023 | Canis | G06N 20/00 707/609 |

(Continued)

FOREIGN PATENT DOCUMENTS

| | | |
|---|---|---|
| CN | 117827743 A | 4/2024 |
| EP | 2833272 A1 | 2/2015 |

*Primary Examiner* — Etienne P Leroux
(74) *Attorney, Agent, or Firm* — PERRY + CURRIER INC.

(57) ABSTRACT

The present invention relates to database search and computation technology providing search results in response to search requests. In response to receiving a search request from one of the plurality of clients, a search platform determines whether to poll an original data source via the communication interface based on a polling control indicator and a load indicator, wherein the polling control indicator indicates a polling level for the search request determined by the search platform and the load indicator indicates an estimated current and future load on the communication interface. In response to determining to poll the original data source, the search platform generates at least one search result for the search request based on data polled from the original data source, and in response to determining not to poll the original data source, the search platform generates at least one search result for the search request locally at the search platform.

11 Claims, 16 Drawing Sheets

(56) References Cited

U.S. PATENT DOCUMENTS

| | | | | |
|---|---|---|---|---|
| 12,058,783 | B2 * | 8/2024 | Paladugu .............. | H04W 88/04 |
| 2011/0119274 | A1 * | 5/2011 | Clayton ................. | G06Q 30/04 707/747 |
| 2012/0166483 | A1 | 6/2012 | Choudhary et al. | |
| 2014/0098666 | A1 * | 4/2014 | Frank .................... | H04L 49/351 370/230 |
| 2019/0213514 | A1 * | 7/2019 | Gonzalez ......... | G06Q 10/06315 |
| 2022/0295151 | A1 * | 9/2022 | Sheldon ......... | H04N 21/234336 |
| 2024/0171810 | A1 * | 5/2024 | Lakshminarasimhan .................... | H04L 67/568 |

* cited by examiner

SMART POLLING

FIELD

The present disclosure relates to an information technology method and a system. More specifically, it relates to database search and computation technology providing search results in response to search requests.

BACKGROUND

Between computing units, the amount of data being exchangeable may be defined by the transmission capacity of the communication interfaces connecting the various computing units as well as the data reception capacity of the computing units themselves, indicated e. g. by the maximum number of connection sockets possible. The rapid progress in communication technologies results in that more data is expected to be transmitted and requested than communication interfaces and computing units are able to transmit and receive, respectively, resulting in a capacity overload.

Attention is drawn to improving the operating mechanisms to reduce the capacity overload occurring at communication interfaces and computing units.

SUMMARY

According to a first aspect, method to process search requests at a search platform is provided. The search platform is communicatively coupled to a plurality of clients as well as, via a communication interface, to an original data source, wherein resources over the communication interface are limited to a given threshold, the method comprising, at the search platform: In response to receiving a search request from one of the plurality of clients, the search platform determines whether to poll the original data source via the communication interface based on a polling control indicator and a load indicator, wherein the polling control indicator indicates a polling level for the search request determined by the search platform and the load indicator indicates an estimated current and future load on the communication interface. In response to determining to poll the original data source, the search platform generates at least one search result for the search request based on data polled from the original data source, and in response to determining not to poll the original data source, the search platform generates at least one search result for the search request locally at the search platform. The search platform returns the at least one search result to the client.

According to a second aspect, a computing system is provided comprising the computing platform, wherein the computing system is arranged to perform the method as described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

BRIEF DESCRIPTION OF THE FIGURES

Aspects and examples of the present disclosure are described with reference to the following figures, in which.

DETAILED DESCRIPTION

Figure 1A:
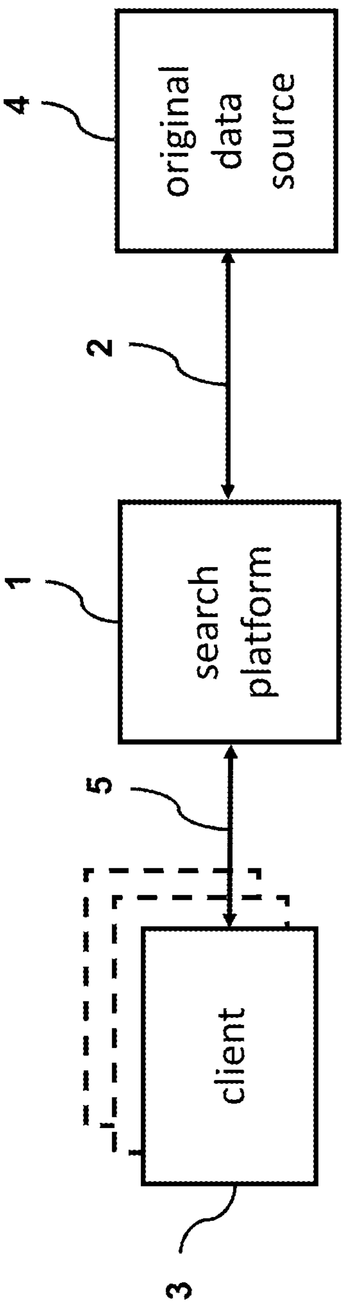
FIG. 1A illustrates a distributed computing system as described herein.

The present disclosure relates to methodologies for smart polling within the processing of requests at a search platform. FIG. 1A shows a computing system comprising a search platform 1, a communication interface 2, a plurality of clients 3 and an original data source 4. The search platform 1 is communicatively coupled to a plurality of clients 3 as well as, via a communication interface 2, to an original data source 4.

Search platform 1, the plurality of clients 3 and original data source 4 are located anywhere and are individual computing machines such as personal computers, mobile stations such as laptops or tablet computers, smartphones, and the like, as well as, in some embodiments, more powerful machines such as database application servers, distributed database systems respectively comprising multiple interconnected machines, data centers etc. In some embodiments, search platform 1, client(s) 3 and original data source 4 might be similar machines, while, in other embodiments, they may be different with respect to e. g. performance and efficiency. In one embodiment, search platform 1, client(s) 3 and original data source 4 are data centers which may be worldwide distributed. Search platform 1 may act as a server towards client(s) 3, processing and serving requests of client(s) 3.

Figure 10:
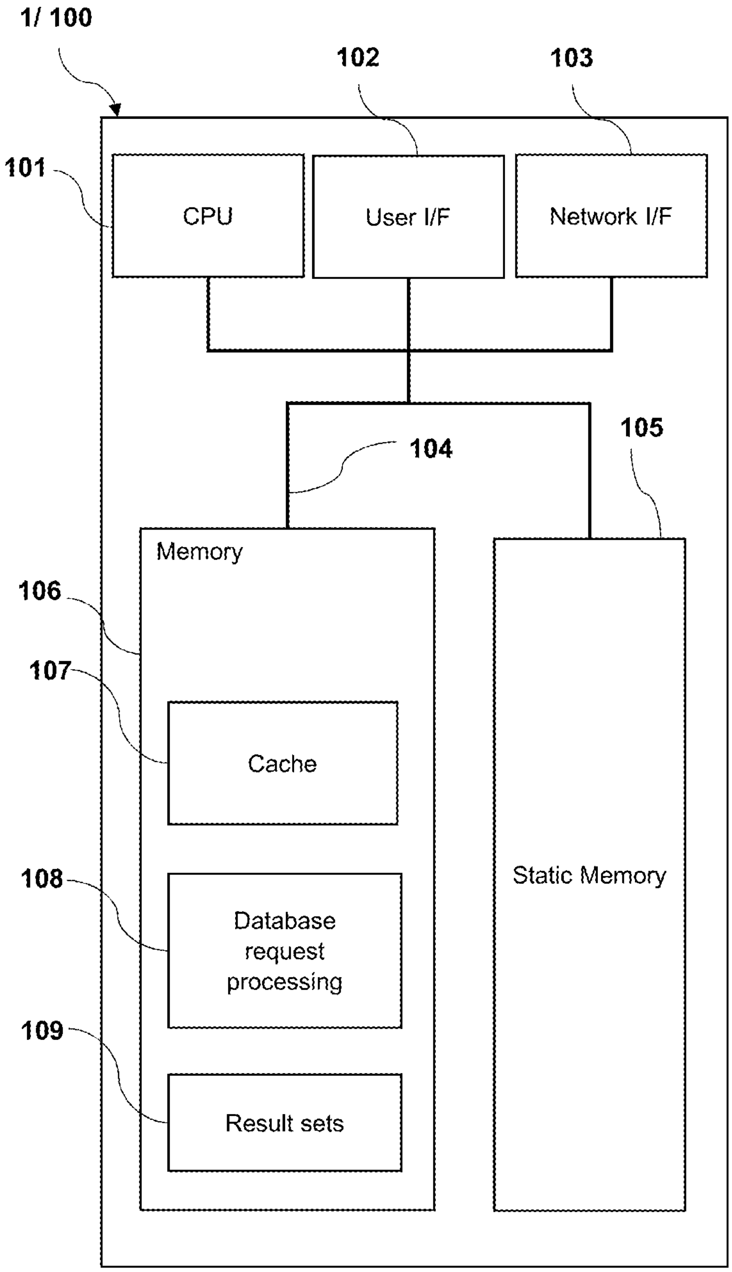
FIG. 10 depicts an internal structure of a computation engine which to host a computer-implemented engine or a database.

Search platform 1, client(s) 3 and original data source 4 may be constituted of several hardware machines depending on performance requirements. Search platform 1, client(s) 3 and original data source 4 are embodied e.g. as stationary or mobile hardware machines comprising computing machines 100 as illustrated in FIG. 10 and/or as specialized systems such as embedded systems arranged for a particular technical purpose, and/or as software components running on a general or specialized computing hardware machine (such as a web server and web clients).

Search platform 1 and original data source 4 are interconnected by communication interface 2, utilizing a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols. In embodiments, the communication interface 2 may comprise the communication means of the original data source 4, such as the communication sockets opened by the original data source 4.

Search platform 1 and client(s) 3 are interconnected by further interface 5, utilizing a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

Figure 1B:
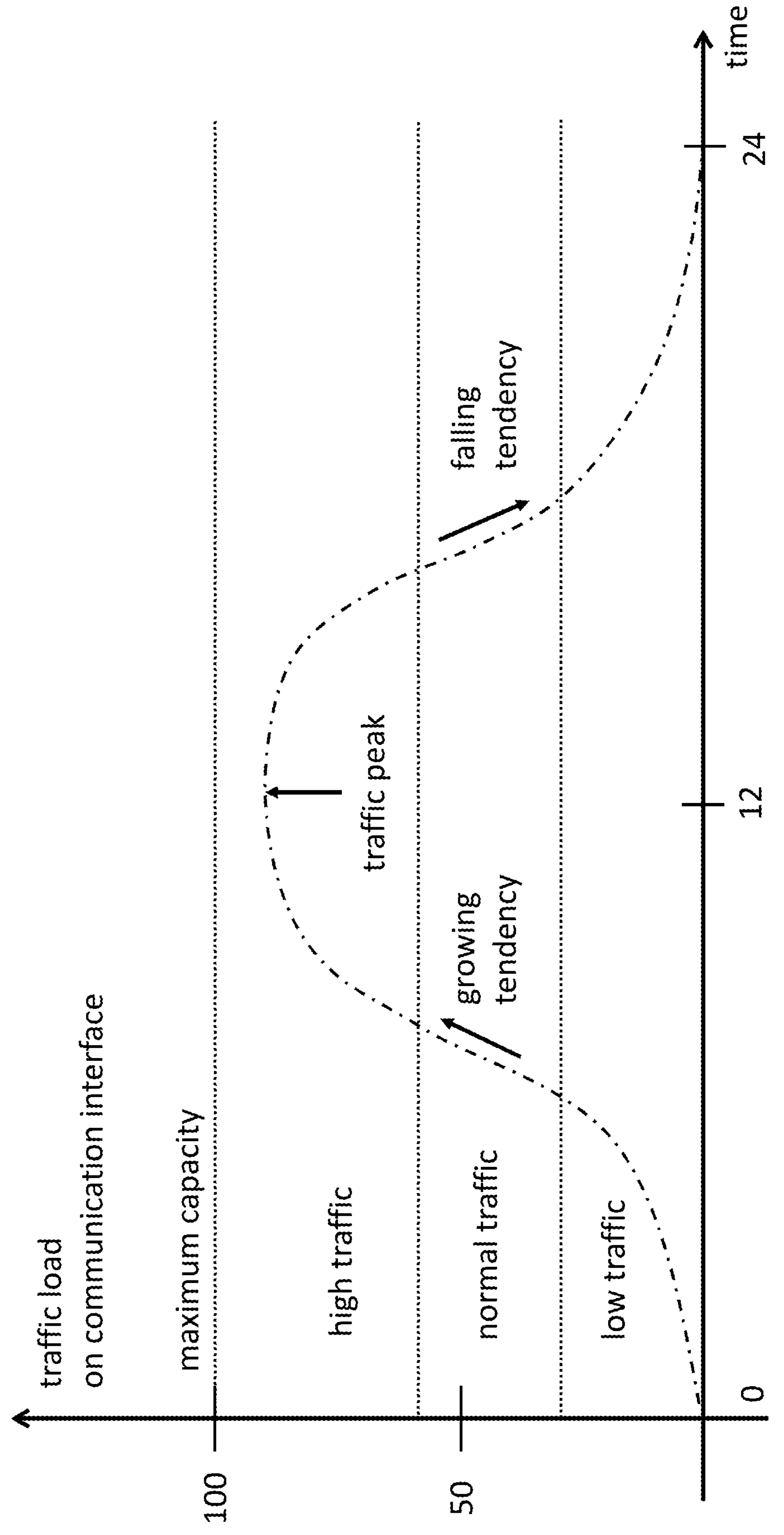
FIG. 1B depicts the traffic load at the communication interface as depicted herein.

FIG. 1B shows the traffic load at the communication interface 2 as a function of time. The traffic load may comprise the polling requests sent by search platform 1 to the original data source 4 and the data sent by original data source 4 to search platform 2 in response to the polling requests. The traffic load occurring at the communication interface 2 may be considered as "low" in the case the amount of traffic does not exceed e. g. 30% of the maximum load capacity of the communication interface, with the maximum load defined at a threshold of 100%. The traffic load occurring at the communication interface may be considered as "normal" if the traffic amount lying between e. g. 30% and 60% of the maximum capacity. The traffic load may be considered as "high" when lying between e. g. 60% and the maximum load capacity of the communication interface 2. A traffic load exceeding the maximum load capacity of the communication interface 2 may be considered as traffic overload, such as e. g. a traffic load of 115%. As it can be seen from FIG. 1B, a maximum peak of the traffic load occurs at a time point of roughly 12 time-units, after a growing tendency stating at 0 time-units and being followed by a falling tendency ending at 24 time-units. The time-units as shown in FIG. 1B may be indicate the hours of day, with 12 time-units indicating noon and 24 time-units indicating midnight. As one can see, a growing traffic load at the communication interface 2 may occur in the forenoon of a day, which may be the result of the increasing network activities when the working hours of a day e. g. in a certain country or region start. Similar, the falling tendency of the traffic load at the communication interface 2 in the afternoon may indicate the closing of the working hours of said day.

Search requests (or requests), which are requested from client(s) 3 over the interface 5 are received at the search platform 1. Search platform 1 may implement standardized communication protocols across the layers of the OSI reference model. Amongst others, the search platform 1 may employ initial processing mechanisms such as error recognitions and corrections, packet assembly, as well as determination whether a request has been received. Invalid messages may be discarded by search platform 1 for reasons of security and performance.

The requests described herein may relate to any use case in the field of database, messaging and/or networking technology and others. Generally, requests may be given by any data structure received at the search platform 1 by one or more network protocols and may cause the computing device 1 to process the request. Typically, a request causes the search platform 1 to react towards the requestor with a response, but any types of request processing is encompassed herein, including request processing without any responses. Typically use cases of requests are search platforms, messaging platforms, database systems, server systems, client/server-based request-response protocols.

Figure 2A:
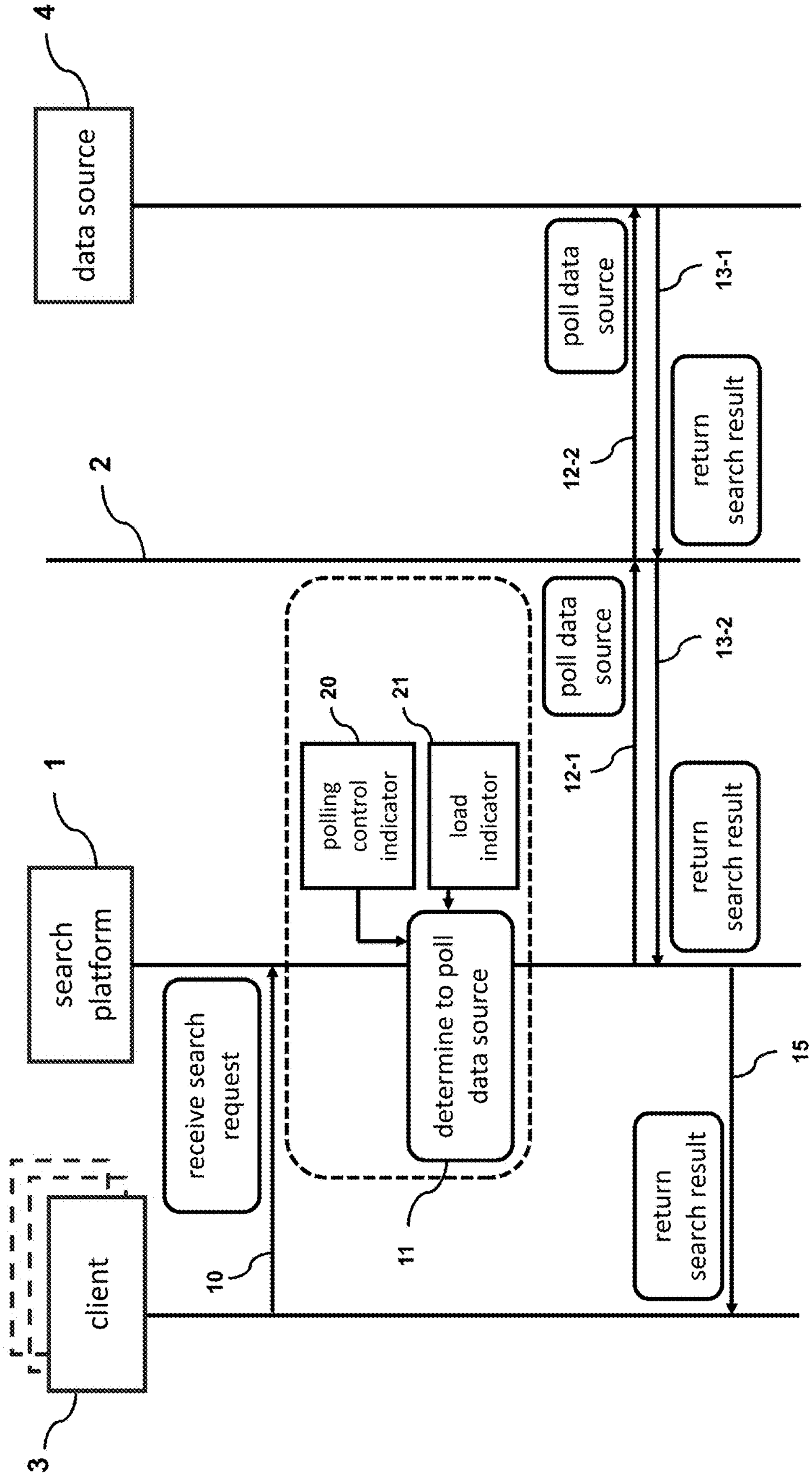
FIGS. 2A, 2B show a flow chart for smart poling within the processing of search requests from a client.
Figure 2B:
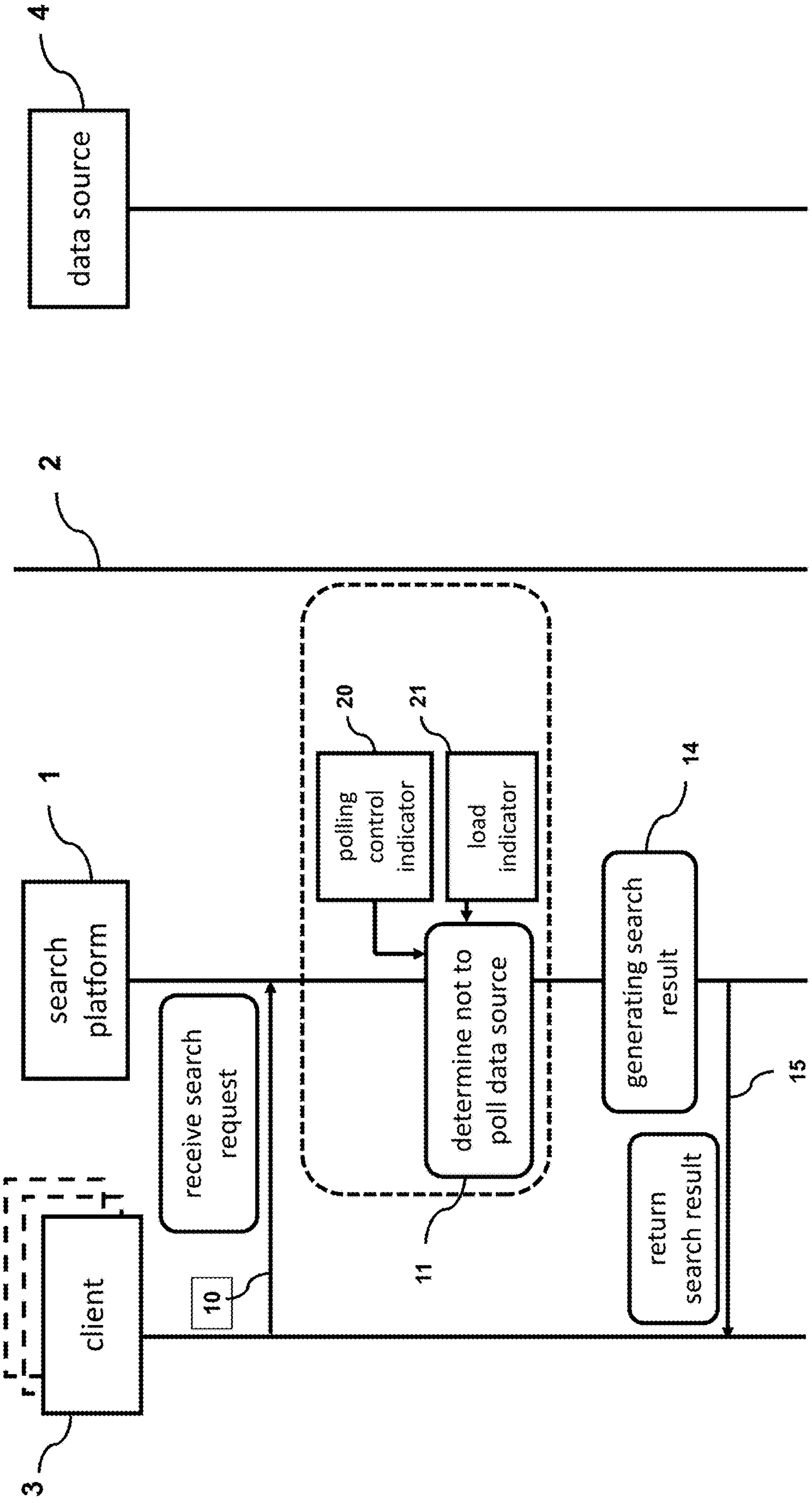

FIGS. 2A, 2B show a flow chart for smart polling within the processing of requests at a search platform 1 according to some embodiments. The resources over the communication interface 2 are limited to a given threshold, such as the maximum number of communication sockets that may be opened at the data source 4 or the maximum data transmission capacity of communication interface 2 itself. Further, the resources over the communication interface may be determined by the current (or maximum) computational capacity of the data source 4. If, as an example, the communication interface 2 is able to provide more polling requests per time unit than the data source 4 is currently able to process, then the transmission rate over the communication interface 2 may be limited to the current processing rate of the data source 4.

In response to receiving, in an activity 10, a search request from one of the plurality of clients 3, search platform 1 determines, in an activity 11 whether to poll the original data source 4 via the communication interface 2 based on a polling control indicator 20 and a load indicator 21. The polling control indicator 20 indicates a polling level for the search request determined by the search platform 1 and the load indicator 21 indicates an estimated current and future load on the communication interface 2. As shown in FIG. 2A, in response to determining 11 to poll the original data source, search platform 1 receives at least one search result for the search request based on data polled (activities 12-1, 12-2, 13-1, 13-2) from the original data source 4. As shown in FIG. 2B, in response to determining not to poll the original data source, search platform 1 generates, in activity 14, at least one search result for the search request locally at the search platform 1. As shown in FIGS. 2A, 2B, search platform 1 returns, in an activity 15, the at least one search result to the client 3.

Figure 2C:
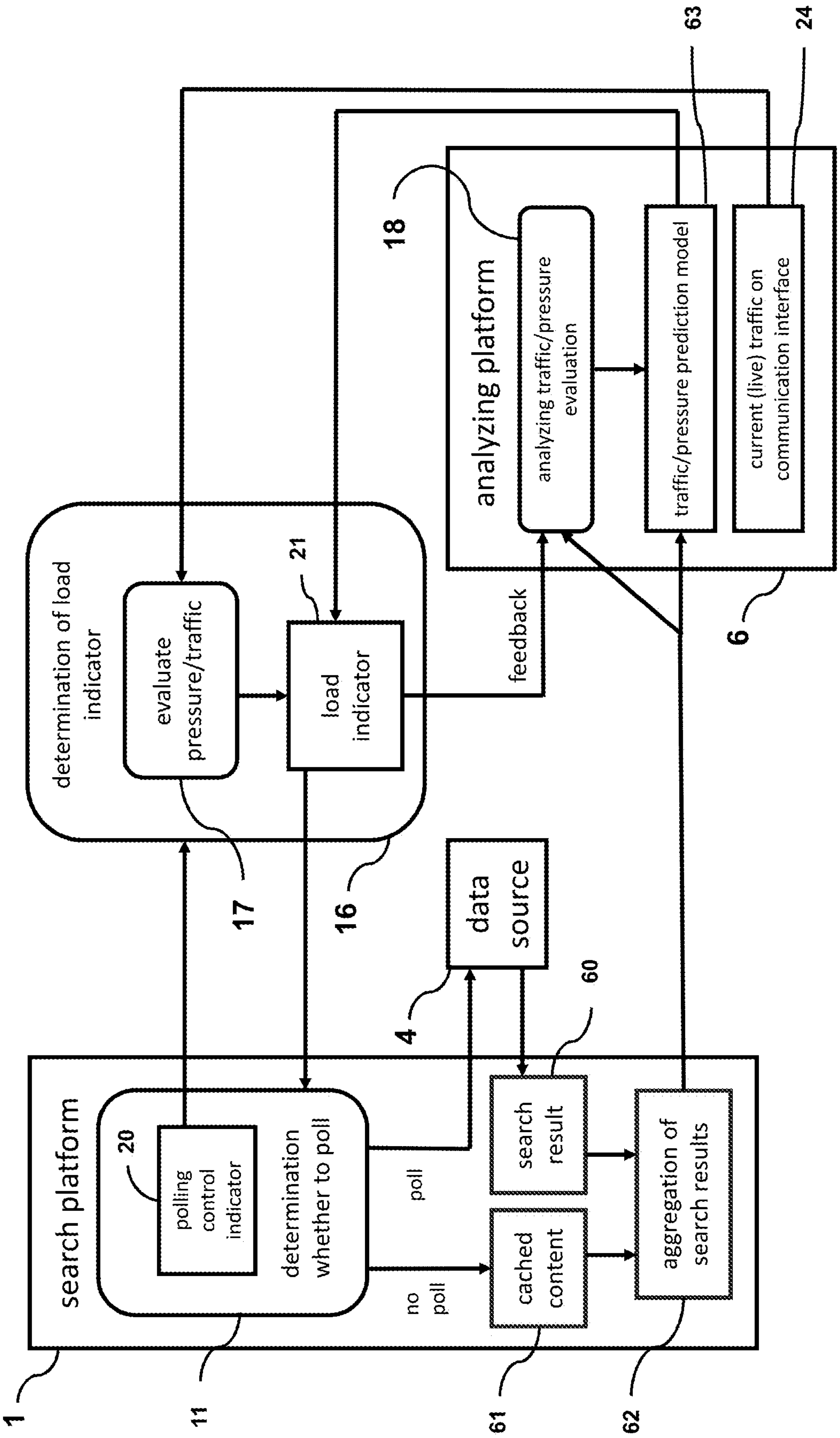
FIG. 2C depicts the determination whether to poll a data source as described herein.

FIG. 2C shows an example for an embodiment of the sequences illustrated in FIGS. 2A, 2B. The processing of the search requests is based on the determination of the polling control indicator 20, which may be determined at the search platform 1, as well as on the determination 16 of the load indicator 21. Both indicators 20, 21 serve as the basis for the determination 11, which search requests are eligible for polling the data source 4 and which search requests are to be processed locally at the search platform 1.

The polling control indicator 20, $P_{sel}$, indicates, based on the content of the search request and on the type of the requesting client 3, a priority, i. e. a "need" or "urgency" to poll the data source 4. The polling control indicator 20 may, in some embodiments, relate to a likelihood of a client selection for search results which are to be returned in response to the search request. For example, the search platform 2 utilizes a machine-learning model to derive a likelihood of a client selection for the corresponding search results of the present search requests based on the statistical data. The statistical data may also form a part of such model, e.g. as previous input or training data. Alternatively, or in addition, the search platform 2 may also employ a set of rules to determine a likelihood of client selection based on the statistical data.

The likelihood of client selection may refer to a search result selection by the client 3. To this end, generally, any feedback from the clients 3 received on the basis of search response may be evaluated and may be stored as part of the statistics. In particular, the client 3 may select one or more of the returned search results and provide a client selection. The search result selection may indicate if the client 3 reverts back to the search platform 2 with a client selection at all, and, if affirmative, how many and/or which search results have been selected. This client selection may constitute an objective indication of the quality of the service of the search processing by the search engine from the perspective of the clients 3.

The polling control indicator 20 may also be determined based on Quality-of-Service-(QoS)-levels, $P_{qos}$, associated for the clients 3. Such QoS-levels may have been defined or negotiated earlier for one or more clients 3. In an example, a client 3 may be associated for a service level of "high" or "gold-class", indicating e. g. that search requests originating from this client 3 will be processed by polling the data source 4 even in the case of a high traffic/pressure load at the communication interface 2. On the other hand, a QoS-level of "medium" or "silver-class" may indicate that search requests originating from corresponding clients 3 are processed by polling data source 4 when there is currently no request from a "gold-class" client 3 to be polled or the polling of data source 4 for all search requests from "gold-class" clients 3 have been already processed. For search requests originating from clients 3 associated with a service level "low" or "bronze-class", corresponding search requests are to be processed by polling data source 4 when there are currently no search requests from "gold-class" or "silver-class" clients 3 or the polling of data source 4 for all corresponding search requests have already been completed.

The likelihood of client selection $P_{sel}$ and the determined QoS-level $P_{QoS}$ for e. g. client 3 may form the basis for the determination of the polling control indicator as e. g. defined by the following equation:

$$\text{Polling Control Indicator} = P_{sel} \times P_{QoS};$$

The present methods make use of the insight that the quality of service (QoS) of the search results returned by the search platform 1 in response to the search request 10 may influence the likelihood of client selection as this is a part of $P_{QoS}$, but that the quality of service of the search results does not influence the general likelihood of client selection of an existing search result, $P_{sel}$.

The polling control indicator 20 may also be determined based on further or other factors such as the additional relation to the selections of returned search results executed by alternative clients, e. g. with respect to client 3, and the corresponding QoS-levels for said alternative clients, as well as client selection preferences.

The determination 16 of the load indicator 21 may be based on the evaluation 17 of the current or live pressure/traffic 24 on the communication interface 2, as shown in FIG. 1B, such as an average number of polling activities per second executed during the last hour/minute or the ratio of the number of polling activities versus the number of client selections of past retuned search results. The load indicator 21 may indicate a growing tendency of the traffic/pressure load at the communication interface 2, as shown in FIG. 1B for a forenoon phase of a day being defined by a 24-hour cycle, resulting e. g. in a higher value for the load indicator 21. The load indicator 21 may also indicate a peak and a falling tendency of said traffic/pressure load, as also depicted in FIG. 1B for the noon and afternoon phase of the day, respectively, resulting in a maximum or a lower value for the load indicator 21. Based on this, the load indicator 21 may be modelled to predict or extrapolate the traffic/pressure load at the communication interface 2, such as a growing traffic/pressure load at the communication interface 2 usually occurring in the forenoon of a day, a maximum load occurring at noon, a falling load occurring at afternoon and a minimum load occurring at midnight of a day, indication the working activities of a country, a region etc. during a day, as shown in FIG. 1B.

The load indicator 21 may be determined based on the pressure/traffic prediction model 63, as illustrated in FIG. 2C, which itself may be based on the aggregated search results 62 comprising the search results 60 based on the data polled from the data source 4 and the search results generated from (already) cached content 61, such as cached earlier search results. The load indicator 21 may be received by the search platform 1 for the determination activity 11 as well as feedback for analyzing 18 the traffic/pressure evaluation the generation, this analysis 18 forming as basis for the generation the updating of the traffic/pressure prediction model 63.

The determination of the load indicator 21 may be based on the current load, i. e. the traffic/pressure on the communication interface 2 at a certain point in time, such as 12 tome units (corresponding to 12 o'clock) and/or the original data source 4 and the latter ones limited resources. In the case of a heavy load, such as the peak load occurring at noon in FIG. 1B, indicating a possible longer response time to be expected for a polling request, the load indicator 21 may indicate to refrain from polling and to generate a search result to a search request based on already cached response data relating to earlier search requests.

The determination of the load indicator 21 may comprise the comparison of the load indicator 21 with a preset capacity target threshold of the communication interface 2. The capacity target threshold may be adaptable e. g. for different clients 3. The determination of the load indicator 21 may comprise the inclusion of a tolerance band or buffer, having a width of e. g. 5%. The capacity target threshold may be set at 90%, indicating that a polling of the data source 4 may not executed in the case the determined value of the load indicator 21 is above the capacity target threshold 21. However, a polling of the data source may still be technically feasible since the aforementioned maximum capacity threshold of the communication interface 2 is set at 100%, said maximum capacity threshold indicating e. g. the maximum resources of the communication interface 2, such as, as already mentioned above, the maximum number of communication ports or sockets that may be opened at the data source 4 or the maximum data transmission capacity or bandwidth of communication interface 2 itself. Further, the resources over the communication interface 2 may be determined by the current (or maximum) computational capacity of the data source 4. In the case the polling control indicator 20 indicated a high priority, i. e. a high "need" or "urgency" to poll the data source 4, a corresponding polling may nevertheless be executed if the target capacity threshold still lies within the tolerance band/buffer of 5% of the load indicator 21.

As an example, the value of the determined load indicator 21 may be 92%, therefore lying above the capacity target threshold of 90% of the communication interface 2. However, said capacity target threshold of 90% still lie within the tolerance band/buffer set at 5% of the load indicator 21. Further, the tolerance band/buffer of 5% for the value of 92% of the load indicator 21 is not in conflict with the maximum capacity of 100% of the communication interface 2. For the subsequent determination 11 whether to poll the data source 4, the value of the load indicator 21 of 92% may therefore still be sufficient to indicate that the data source 4 may nevertheless be polled in the case the polling control indicator 20 indicates, e. g. for requesting client 3, a high priority, i. e. a high "need" or "urgency" to poll the data source 4.

Polling control indicator 20 and load indicator 21 are determined/calculated parallel or offline to the handling and processing of the search requests. In embodiments, both indicators 20 and 21 may be calculated offline, stored e. g. at the search platform 1 and retrieved and used for the processing of the search requests.

Both, polling control indicator 20 and load indicator 21 present an "overall picture" as basis for the determination 11 whether to poll the data source 4, with this "overall picture" indicating on one hand the content of the search request and the type of the client 3, both reflecting the priority of the search request, and on the other hand the current capabilities of the computation system to provide an updated and therefore valid search result for the search request.

The polling control indicator 20 and the load indicator 21 may be combined to form the basis for the determination 11 whether to poll the data source 4. The combination may comprise a weighted sum of both, the polling control indicator 20 and the load indicator 21. In the case of a time-dependency of at least one indicator 20, 21, the determination activity 11 comprises the determination of a time-dependent correlation function involving both indicators 20, 21. The combination of the two indicators 20, 21, e. g. the determination of the corresponding indicator weights applied in the summation may form part of the activities of the traffic/pressure prediction model 63.

Figure 3A:
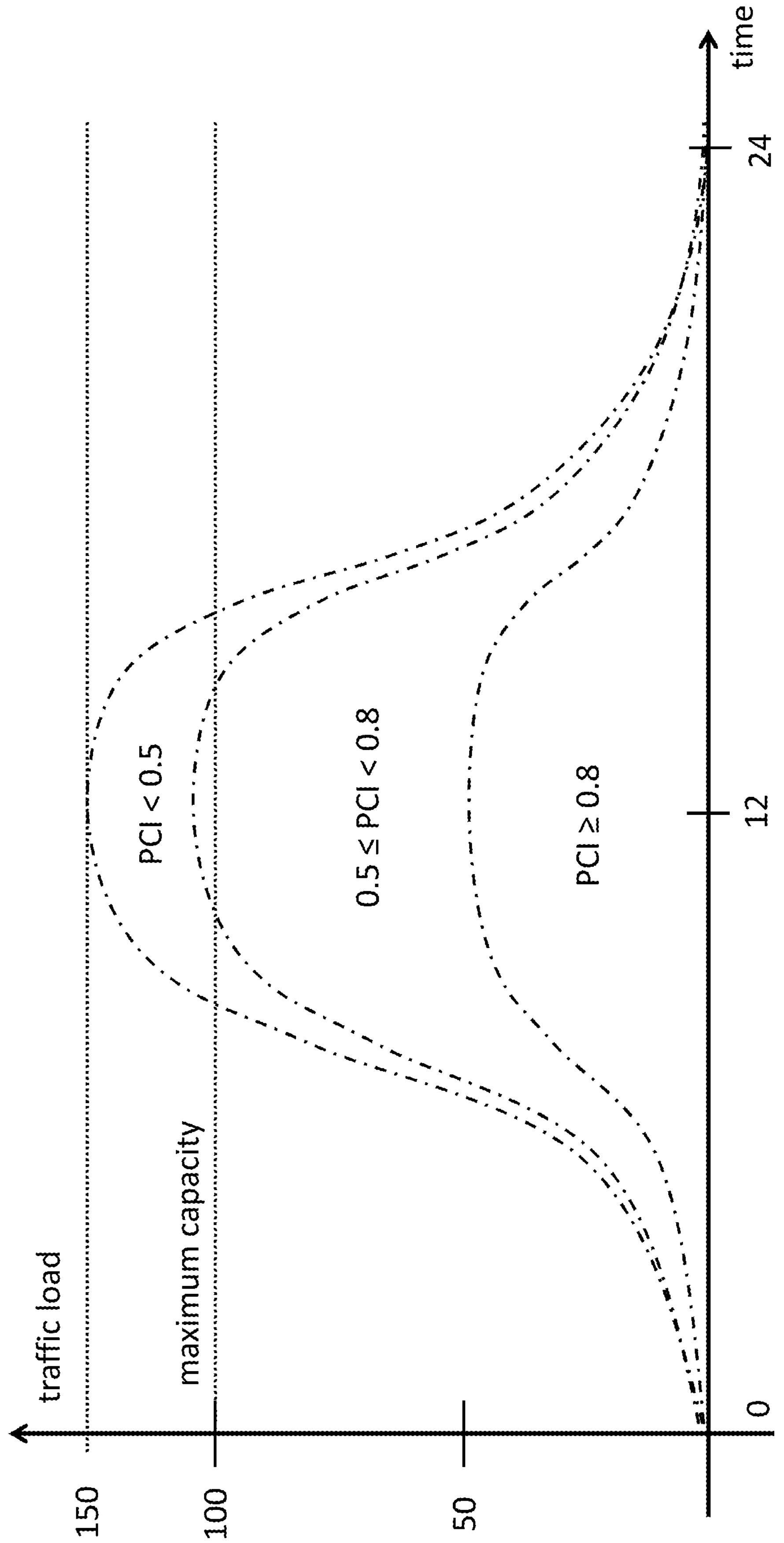
FIGS. 3A, 3B, 3C, 3D show the reduction of the traffic load caused by polling control as described herein.

As an example, the combination may be calculated as follows, referring to an example comprising e. g. three categories of polling-levels, or PCI-ratios, such as "PCI<0.5", "0.5≤PCI<0.8" and "PCI≥0.8", as shown in FIG. 3A:

$$\text{global load indicator} = \frac{\text{traffic (communication interface 2)}}{\text{capacity (communication interface 2)}};$$

$$\text{polling control indicator } PCI_{(QoS)} = P_{sel} \times P_{QoS} \text{ (as defined above)};$$

$$\text{load indicator} = \frac{\text{traffic } (PCI)}{\text{capacity (communication interface 2)}};$$

values for determination whether to poll:

$$\text{traffic selection to allow polling} =$$

$$a.\text{traffic } (PCI < 0.5) + b.\text{traffic } (0.5 \leq PCI < 0.8) + c.\text{traffic } (PCI \geq 0.8);$$

where $$a.\text{traffic } (PCI < 0.5) = \frac{\text{load indicator } (PCI < 0.5) - (\text{global load indicator} - 1)}{\text{load indicator } (PCI < 0.5)}$$

$$\text{with min } (a.\text{traffic}) = 0 \text{ and max } (a.\text{traffic}) = 1;$$

$$b.\text{traffic } (0.5 \leq PCI < 0.8) = \frac{\text{load } ind. (0.5 \leq PCI < 0.8) - (\text{global load indicator} - 1 - \text{load } ind. (PCI < 0.5))}{\text{load indicator } (0.5 \leq PCT < 0.8)}$$

$$\text{with min } (b.\text{traffic}) = 0 \text{ and max } (b.\text{traffic}) = 1;$$

$$c.\text{traffic } (PCI \geq 0.8) = \frac{\text{load } ind. (PCI \geq 0.8) - (\text{global load } ind. - 1 - \text{load } ind. (PCI < 0.5) - \text{load } ind. (0.5 \leq 0.5 < 0.8))}{\text{load indicator } (PCI \geq 0.8)}$$

$$\text{with min } (c.\text{traffic}) = 0 \text{ and max } (c.\text{traffic}) = 1;$$

In some embodiments, the splitting the PCI-ratio may be adapted statically or dynamically.

In the following, a numerical example is presented to illustrate the aforementioned formulas. The polling control indicator PCI=$P_{sel}$×$P_{QoS}$ may be set to 0.8×0.5=0.4, assuming that the probability for a client selection is low and therefore, a low QoS-level may be required. Further, it is assumed that corresponding data may be present in the cache. The traffic currently occurring at the communication interface 2 may be assumed as 15000 transactions per second (tps), with the capacity of the communication interface 2 being 10000 tps. Therefore, global load indicator has a value of 15000 tps/10000 tps=1.5. This value exceeds the ratio of 1 indicating the situation wherein the communication interface operates over its maximum capacity, as illustrated in FIG. 3A. Therefore, parts of the traffic occurring at the communication interface 2 may be eliminated in order to enable the communication interface 2 to operate again at conditions at, near or under its maximum capacity, therefore at conditions wherein global load indicator has a value of, near or below 1. Using e.g. log data from log files, the traffic may be partitioned per polling level, or PCI-ratios, as follows:

$$\text{load indicator } (PCI < 0.5) = \frac{\text{traffic } (PCI < 0.5)}{\text{capacity (communication interface 2)}} = \frac{4000 \text{ tps}}{10000 \text{ tps}} = 0.4;$$

$$\text{load indicator } (0.5 \leq PCI < 0.8) = \frac{\text{traffic } (0.5 \leq PCI < 0.8)}{\text{capacity (communication interface 2)}} = \frac{7000 \text{ tps}}{10000 \text{ tps}} = 0.7;$$

$$\text{load indicator } (PCI \geq 0.8) = \frac{\text{traffic } (PCI \geq 0.8)}{\text{capacity (communication interface 2)}} = \frac{4000 \text{ tps}}{10000 \text{ tps}} = 0.4;$$

Then, the values for $a$.traffic, $b$.traffic and $c$.traffic are calculated as follows:

$$a.\text{traffic } (PCI < 0.5) = \frac{\text{load indicator } (PCI < 0.5) - (\text{global load indicator} - 1)}{\text{load indicator } (PCI < 0.5)} =$$

$$= \frac{(0.4 - (1.5 - 1))}{0.4} = -\frac{0.1}{0.4} = -0.25 = >$$

this value may be set to 0 with min ($a$.traffic) = 0 and max ($a$.traffic) = 1;

$$b.\text{traffic } (0.5 \leq PCI < 0.8) = \frac{\text{load } ind. (0.5 \leq PCI < 0.8) - (\text{global load indicator} - 1 - \text{load } ind. (PCI < 0.5)}{\text{load indicator } (0.5 \leq PCT < 0.8)} =$$

$$\frac{0.7 - (1.5 - 1 - 0.4)}{0.7} = \frac{0.6}{0.7} = 0.857 = >$$

this value remain at 0.857 with min ($b$.traffic) = 0 and max ($b$.traffic) = 1;

$$c.\text{traffic } (PCI \geq 0.8) = \frac{\text{load } ind. (PCI \geq 0.8) - (\text{global load } ind. - 1 - \text{load } ind. (PCI < 0.5) - \text{load } ind. (0.5 \leq 0.5 < 0.8))}{\text{load indicator } (PCI \geq 0.8)} =$$

$$\frac{0.4 - (1.5 - 1 - 0.4 - 0.7)}{0.4} = \frac{04 + 0.6}{0.4} = 2.5 = >$$

Figure 3B:
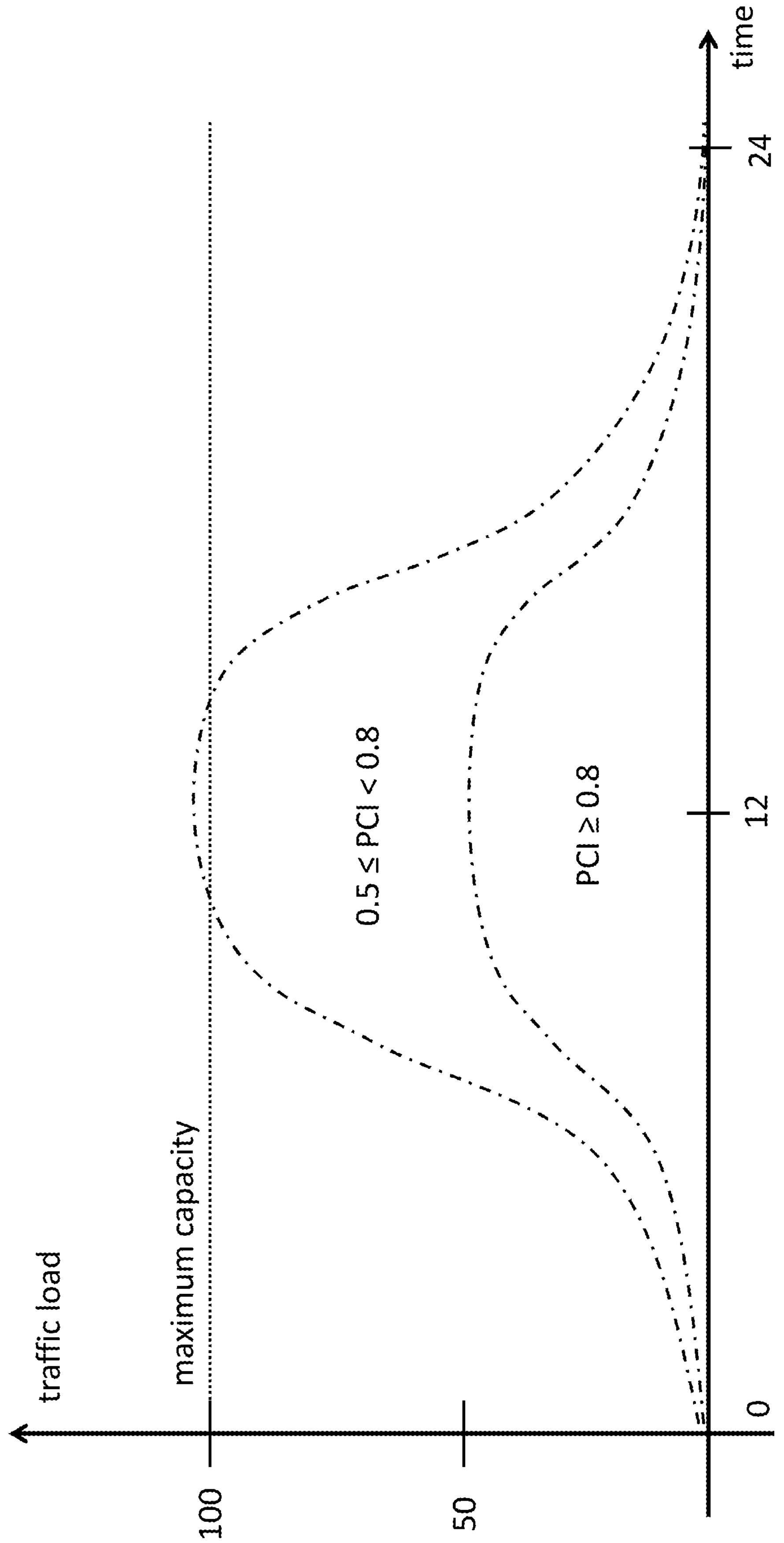

-continued this value will be set to 1 with min ($c$.traffic) = 0 and max ($c$.traffic) = 1;

As a consequence, the values for the factors a.traffic, b.traffic and c.traffic to be applied in order to eliminate parts of the traffic at communication interface 2 to meet its capacity are:

- a.traffic=0 for traffic with PCI<0.5, resulting in 0% of the traffic with PCI<0.5 being allowed to occur at the communication interface 2. Therefore, all traffic of this type is eliminated at communication interface 2, as shown in FIG. 3B;
- b.traffic=0.857 for traffic with 0.5≤PCI<0.8, resulting in 85.7% of the traffic with 0.5≤PCI<0.8 being allowed to occur at the communication interface 2. Therefore, 24.3% of the traffic of said type is eliminated at communication interface 2;
- c.traffic=1 for traffic with PCI≥0.8, resulting in 100% of the traffic with PCI≥0.8 being allowed to occur at the communication interface 2. Therefore, all of the traffic of this type is allowed at the communication interface 2.

As a consequence, a search request having a polling level or PCI-ratio of 0.4 will not be polled at data source 4.

Using the formulas and equation as described above, it is possible to calculate the type of traffic and the corresponding traffic amounts to be eliminated in order avoid a capacity overload at the communication interface 2.

These equations enable the combination of the load indicator 21 with polling control indicators 20 as a function of QoS-level to determine which search requests with lower QoS-levels may be polled to remain e. g. within the target capacity threshold of the communication interface 2.

In some embodiments, an analyzing platform 6 may be comprised by the search platform 1. The analyzing platform may store the pressure/traffic prediction model 63 and may serve as platform for the analyzing 18 the traffic/pressure evaluation the generation and for the provision of the current or live pressure/traffic 24 on the communication interface 2. In some further embodiments, the data platform 6 may be comprised by a separate entity.

Based on the determination 11 whether to poll the data source 4, as shown in FIG. 2C, either the data source 4 is polled, with the data received from the polling being the basis for the generation of the search results 60, or the search results are generated locally at the search platform 1 based on the (already) cached search results.

By the sequences and the implementation as shown in FIGS. 2A, 2B and 2C a particular way of efficiently processing search requests by considering a limited capacity of communication interfaces, such as communication interface 2, is provided. Due to e. g. of a limited number of connections, such as sockets available per time unit at the original data source 4, communication interface 2 is not able to receive and transmit the whole network traffic in the case every search request originating from clients 3 should be processed using data from data source 4, meaning that for every search request, data source 4 were polled. Therefore, according to the methodology as provided, search requests are processed by search platform 1 in that respect that the search results generated for said requests are based either on most recent updated versions of data received from e. g. the original data base 4 or on cached data stored locally at the search platform 1, with the latter data might representing not the most recent version of said data and therefore representing a potentially invalid version of said data. Search engine 1 therefore operates as an aggregator comprising a smart polling engine selecting which search requests are sent, via the communication interface 2 to the data source 4 (to provide the best quality regarding the validity of the response data) and which search requests are to be degraded.

The sequences and their implementation as described in FIGS. 2A, 2B and 2C enable a flexible adaptation of the polling strategies and the generation of responses to search requests under varying traffic/traffic pressure load conditions and overload conditions at the communication interface 2 between e. g. the search platform 1 and the original data source 4. In addition, future traffic/traffic pressure conditions and overload conditions at the communication interface 2 may be anticipated by executing the aforementioned strategies, resulting in optimizing the usage and distribution of computing and transmission capacities available at e. g. the search platform 1, the original data source 4 and the communication interface 2. Further, sequences and their implementation as described in FIGS. 2A, 2B and 2C enable an efficient way of keeping the data/search results stored at search platform 1 updated and therefore valid.

The methodology as provided therefore limits the polling traffic to be handled by a (distributed) computing system while optimizing the polling behavior.

Figure 3C:
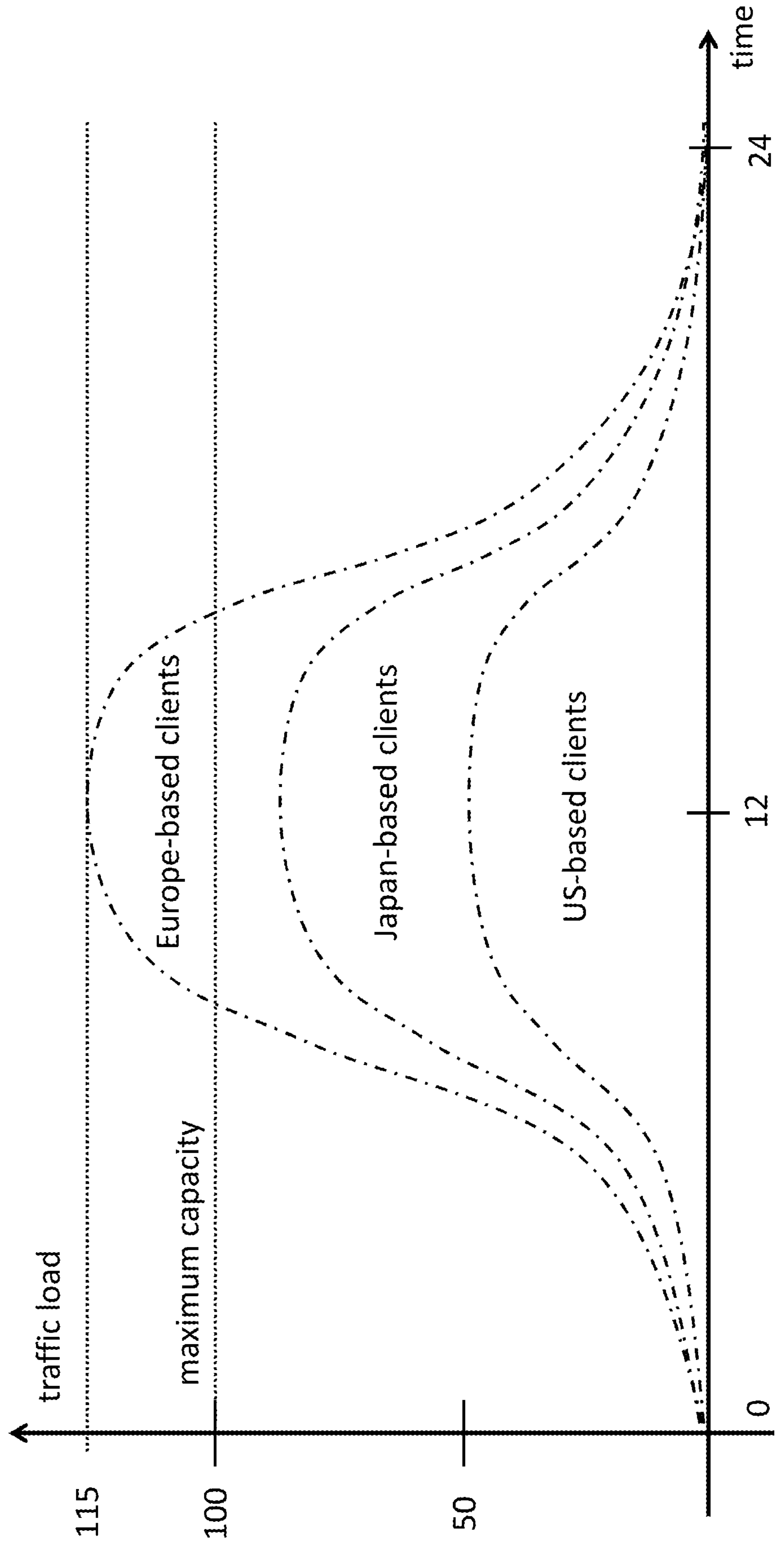

To cite an example, search platform 1 receives 10 multiple search requests from clients 3 residing in the US, in Japan and Europe. Processing these search requests by search platform 1 through the generation of search results by using data received from data source 4 would result, at the time when the peak of the incoming request may occur, in an overloading of the maximum working capacity, or resources, of communication interface 2 of about 115%, as shown in FIG. 3C, exceeding the maximum capacity as defined by a threshold of 100% by 15%, this resulting from transmitting request and response data between search platform 1 and data source 4. The search requests originating from the US-based clients 3 contribute 60% to the overall processing load of the communication interface 2, and the search requests originating from the clients 3 residing in Japan contribute 30% to said processing load. The contribution of the search requests originating from the Europe-based clients 3 to the overall processing load of the communication interface is 25%.

Search platform 1 determines 11 whether to poll data source within the processing of the search request originating from the US-, Japan- and Europe-based clients 3. The polling control indicator 20 as thereby used by search platform 1 indicates as polling level a processing level of "high" or "gold-class" for search requests originating from US-based clients 3, indicating that every search request from a US-based client 3 is processed by polling the data source 4. For search requests originating from Japan-based clients 3, the polling level is "medium" or "silver-class", indicating that those search requests are processed by polling data source 4 when there is currently no search request from a US-based client 3 to be polled or the polling of data source 4 for all search requests from US-based clients have been already processed. For search requests originating from Europe-based clients 3 the polling level is "low" or "bronze-class", indicating that said search requests are to be processed by polling data source 4 when there are currently no search requests from US-based or Japan-based clients 2 or the polling of data source 4 for all US-based and Japan-based search requests have already been completed.

Further citing the example as described, the load indicator 21 as used by search platform 1 for the determination 11 may indicate a current capacity overload of the communication interface 2 of 115%, resulting in that polling data source 4 for incoming and future requests from clients 3 will be prioritized with respect to polling the data source 4.

Figure 3D:
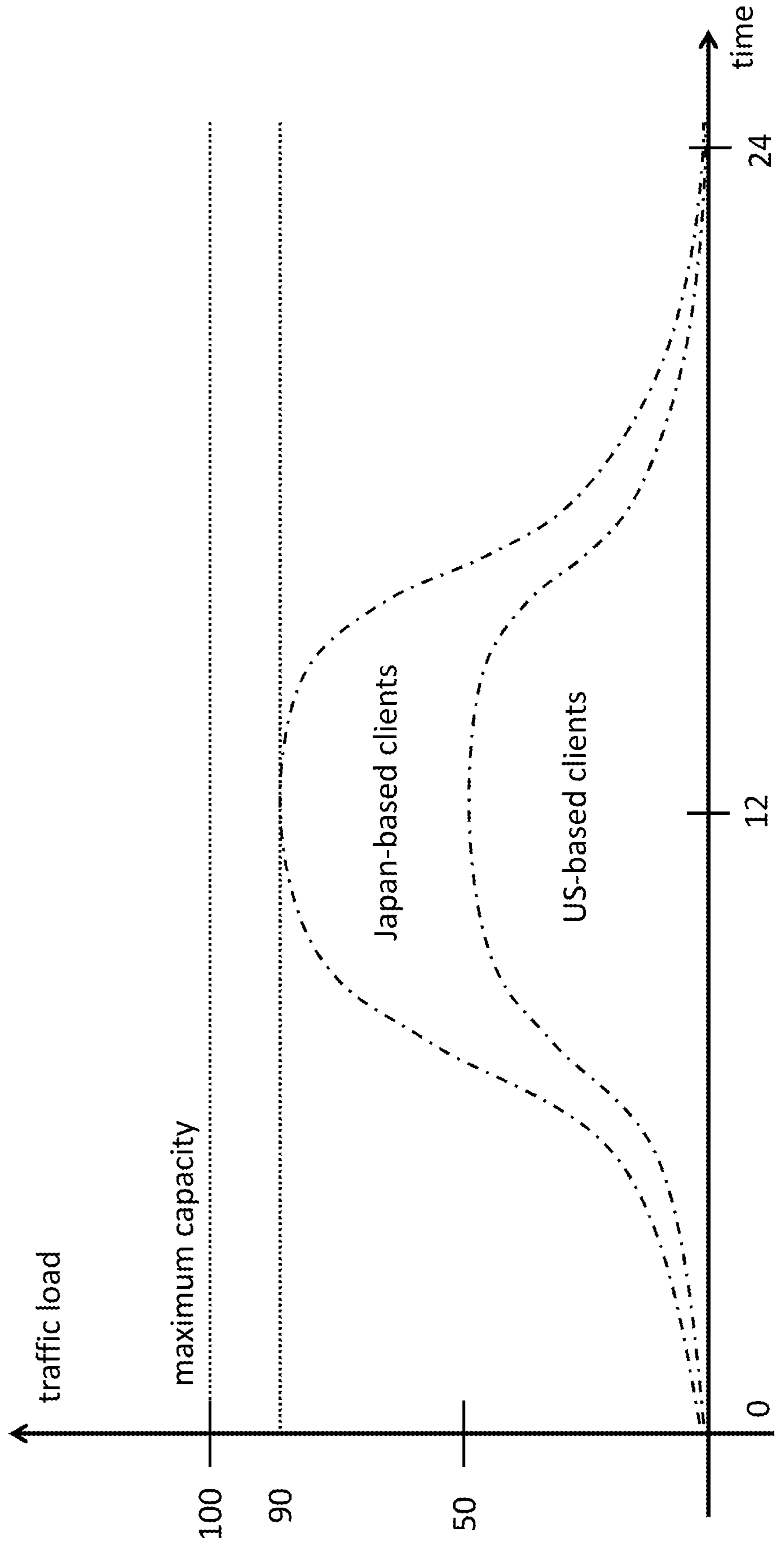

The determination 11 by the search platform 1 yields that the requests originating from the US-based and Japan-based clients 3, since having a polling level of "gold-class" and "silver-class" respectively, will be processed by including polling data source 4, thereby using the most recent updated (and therefore valid) data received from data source 4. The resulting overall working load of the communication interface 2 therefore will be 90%, lying under the capacity threshold as indicated by the value of 100%, as shown in FIG. 3D. On the other hand, requests from Europe-based clients 3, since having a polling level of "bronze-class" only, will be removed from polling, as also shown in FIG. 3D, and instead be processed with potentially degraded data stored locally at search platform 1, e. g. in the cache of search platform 1. Using either the most recently updated data from data source 4 or the degraded data from the cache of search platform 1, a search result is generated 15 by search platform 1 and sent to the requesting US-, Japan- and Europe-based clients 3.

Further elaborating this example, a current contribution of the search requests originating from the US-based clients 3 to the processing load of the communication interface 2 may be only 20% at a certain point in time, resulting in an overall current processing load of the communication interface of 75%. The communication interface 2 is therefore operation with a current workload of 75%, being well under the overload threshold of 100%. Therefore, the requests of all clients 3, i. e. the US-, Japan- and Europe-based clients 3 may be processed using data polled from the data source 4. However, the contribution of the search requests originating from the US-based clients 3 is expected to grow within the next few hours up to 60%, resulting in a capacity overload of the communication interface 2 of 115%, as described above. Therefore, the methodology as described above resulting in the provision of Europe-based clients 3 with only degraded response data may be applied already in advance, e. g. beginning roughly one hour earlier before the contribution by the US-based client 3 will grow up to 60% and when the load capacity of the communication interface 2 is still at 75%, in order to avoid an overload of said communication interface 2 or original data source 4 (of e. g. up to 115%).

Again, further elaborating this example, the current contribution of the search requests originating from the US-based clients 3 to the processing load of the communication interface 2 may rise to 98% at another point in time. This may result in that both, the requests from Japan-based and Europe-based clients 3, since having a polling level of "silver-class" and "bronze-class" and therefore ranging below the "gold-class" level attributed to the US-clients 3, may be removed entirely from the polling of the data source 4 and be processed with using potentially degraded data stored locally at search platform 1. In embodiments, the time point at which the search requests from the Japan- and Europe-based clients 3 may be removed from polling may be defined as the time point when the contribution of search requests of a higher prioritized group of clients 3, such as the US-based clients 3, to the overall traffic load at the communication may exceed a threshold of e. g. 50%.

Figure 4:
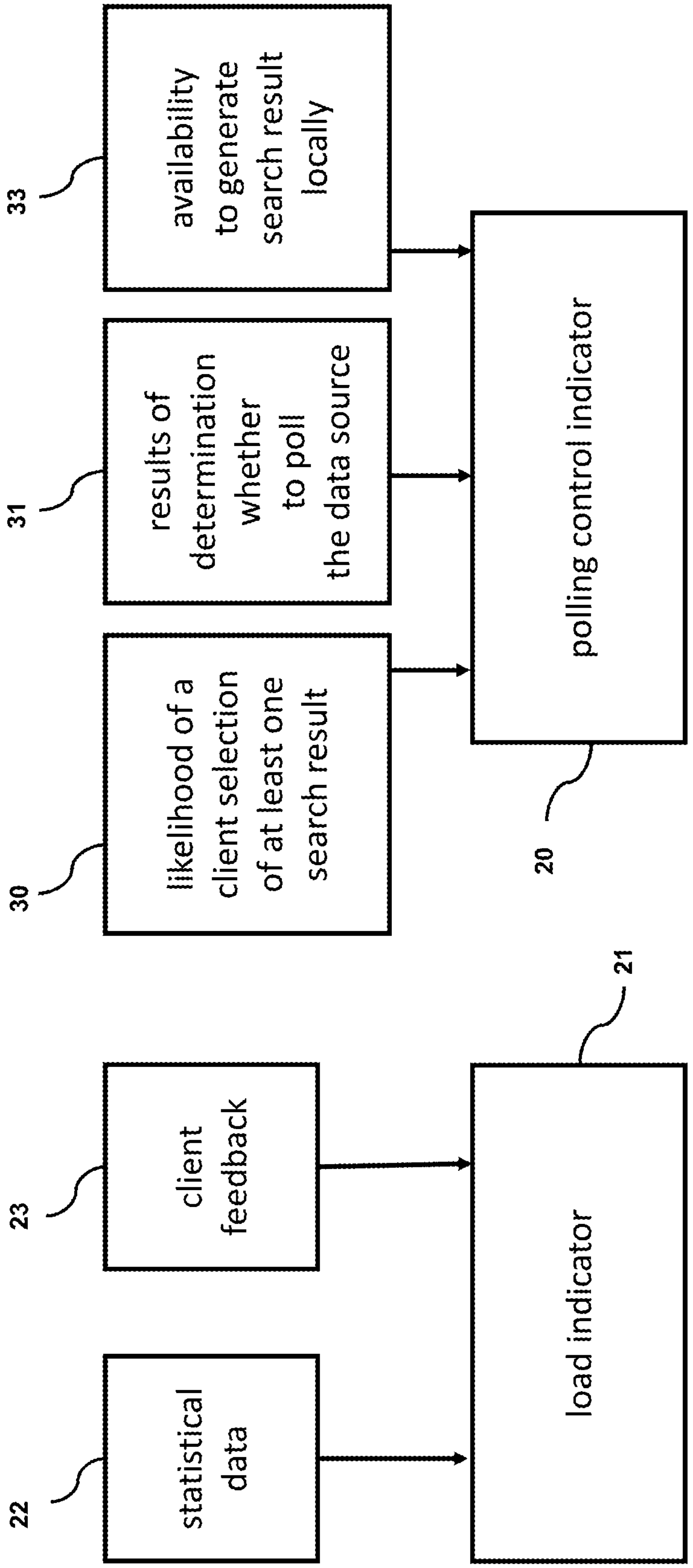
FIG. 4 illustrates the load indicator and the polling control indicator as described herein.

In embodiments and as shown in FIG. 4, the load indicator 21 is determined based on statistical data 22 representing polling decisions for past search requests and client feedback 23 for search results from the plurality of clients 3. This enables the optimal adaptation of the polling behavior within the distributed computing system on repeatedly recurring traffic conditions originating from recurring client-side request patterns.

The statistical data 22 representing the polling decision may be generated by using log data representing the history of polling decisions made by the search platform 1. Said log data may be stored at the search platform 1 or on any other storage device, such as a data platform, accessible by search platform 1. In embodiments, the log data may also represent the feedback of the client(s) 3 for the search results returned 15 to the client(s) 3 in response to the search request. A client-feedback represented by the log data may comprise subsequent requests of the client(s) 3 in response to the search results returned in activity 15.

In embodiments, the log data may comprise data relating to e. g. connection capacity per data source 4, representing e. g. a data provider. The log data may also relate to e, g, the number of connections currently opened/used by the communication interface 2, or relate to the response time when polling the original data source 4, the number of pollings rejected by the data source 4 etc. In embodiments, the log data may comprise aggregated data comprising search results based on data polled from the original data source and search results generated locally at the search platform 1.

Figure 5:
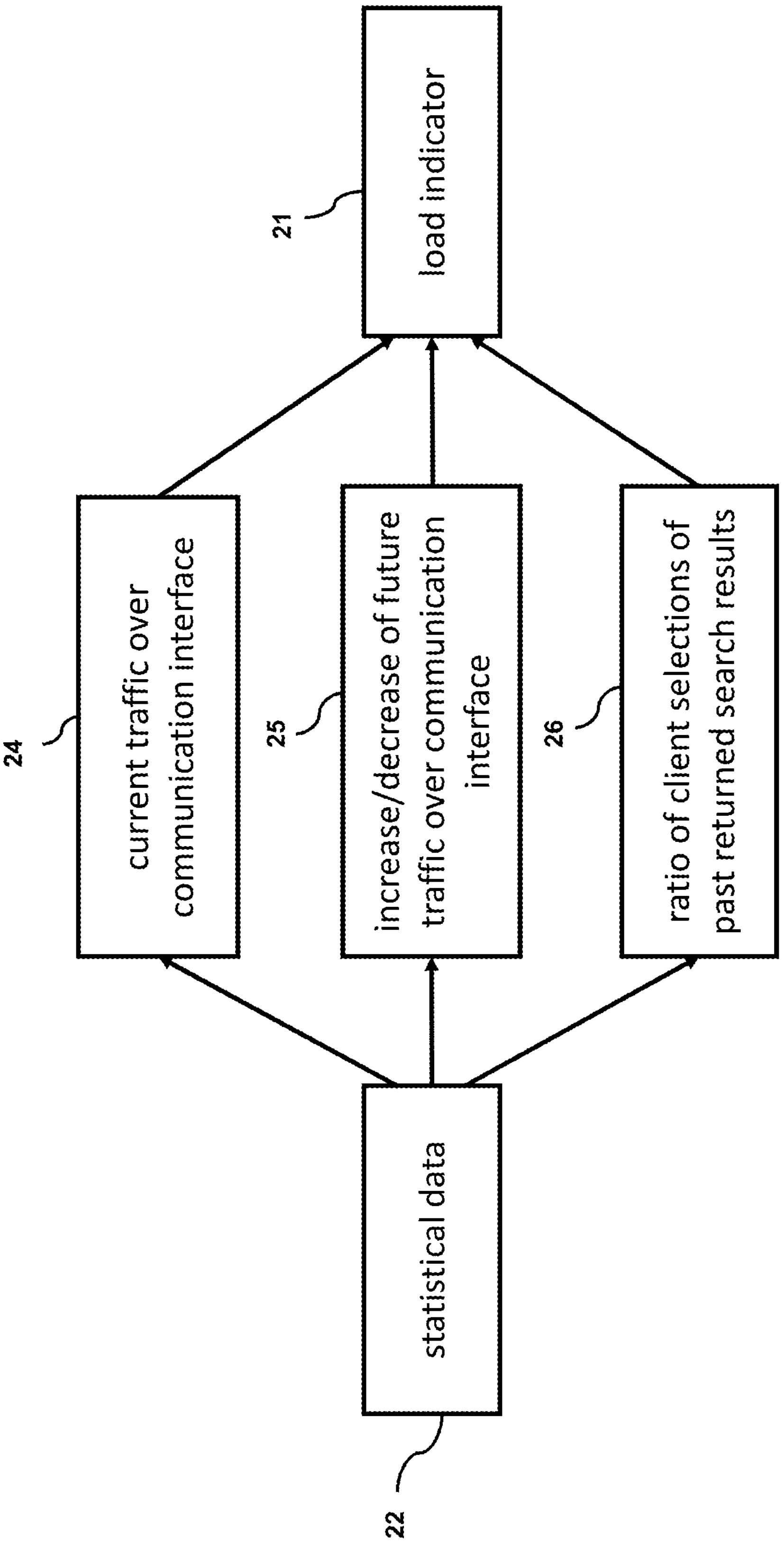
FIG. 5 shows the processing of statistical data as described herein.

In embodiments and as shown in FIG. 5, the statistical data 22 is processed, in order to determine the load indicator 21, to determine at least one of an amount of current traffic 24 over the communication interface 2, an estimation of future increase or decrease of the traffic 25 over the communication interface 2, a ratio of client selections 26 of past returned search results. This enables the usage of the statistical data, which may serve as a basis or optimizing the polling behavior within the distributed computing system, on repeatedly recurring traffic conditions originating from recurring client-side request patterns.

Referring to the example as described above, by processing of the statistical data 22, it may be determined that the current network traffic 24 over the communication interface 2 is such that the workload on the communication interface 2 is 75%, resulting from the reception and the transmission of request and response data between the search platform 1 and the data source 4 and that the traffic over the communication interface 2 will increase 25 such that the workload of the communication interface 2 increases up to 115% within the next two hours due to the contribution from the US-based clients 3 and will remain at this level for the next 12 hours, after which it will decrease, due to the decrease 25 of the network traffic, back to 75%. The determination of the current traffic 24 and/or the increase and/or decrease of the traffic 25 may be executed by using e. g. traffic/pressure prediction models being stored e. g. at the search platform 1 or on any storage device, such as a data platform. In some embodiments, the traffic/pressure prediction model uses log data for the determination of the current traffic 24 and/or the increase and/or decrease of the traffic 25, such as log data referring to the amount of past data traffic 28 over the communication interface 2, as described in subsequent paragraphs within this disclosure. In some embodiment, the log data referring to past data traffic may be stored at the same storage device as the traffic/pressure prediction model. In embodiments, the traffic/pressure prediction model may use for its determination and calculations techniques based on machine learning and artificial intelligence.

In embodiments, the machine learning techniques may be based on neural networks and/or supervised learning and/or unsupervised learning and/or reinforcement learning and/or decision trees. The use of machine-learning based algorithms for the determination of the current traffic 24 and/or the increase and/or decrease of the traffic 25 enables an efficient and optimized determination 11 whether to poll the original data source 4.

In embodiments, the machine learning techniques may comprise federated machine learning, using input vectors as well as training vectors. Federated machine learning comprises of machine learning techniques that trains an algorithm via multiple independent sessions, with each session using its own dataset. Federated machine learning enables building a common, robust machine learning model without sharing data, thus addressing critical issues such as data privacy, data security, data access rights and access to heterogeneous data. A machine learning algorithm, such as a deep neural network, is trained on multiple local datasets contained in local nodes without exchanging data samples. Local models are trained on local data samples and parameters (e.g. the weights and biases of a deep neural network) between these local nodes are exchanged at some frequency to generate a global model shared by all nodes. The input vectors may be composed of the relevant data related e. g. to the traffic log data. A new training vector may be computed each time when a determination is made whether to poll the original data source 4. This e. g. enables to determine, whether the rules used for the determination whether to poll the original data source 4 have to be changed. Federated machine learning may be executed by a number of computing platforms, such as a number of search platforms 1, with each search platform 1 polling different data sources 4 or by any other storage devices, such as data platforms.

In embodiments, the traffic/pressure prediction model may be built offline in activities separate from those activities relating to the processing of the search requests as described above. The building of the traffic/pressure prediction model may be executed at the search platform 1 or an any other one or more computation device.

In some embodiments, for the determination of the current traffic 24 and/or the increase and/or decrease of the traffic 25, rules for predicting the traffic may be applied as well as rules for determining whether, for a received request, the original data source 4 will be polled. The rules may be derived, adapted and updated based on the traffic/pressure prediction model. In embodiments, the rules may be used for the determination of the polling control indicator and the load indicator.

By processing the statistical data 21, it may also be determined that the ratio 26 of client selections vs. non-selections of past response data is 98% in the case the search result get generated by using updated data polled from the original data source 4. On the other hand, by the processing of the statistical data 21, it may also be determined that the ratio 26 of client selections vs. non-selections of past search results is 85% in the case the search results get generated by using (degraded) data cached by the search platform 1.

Figure 6:
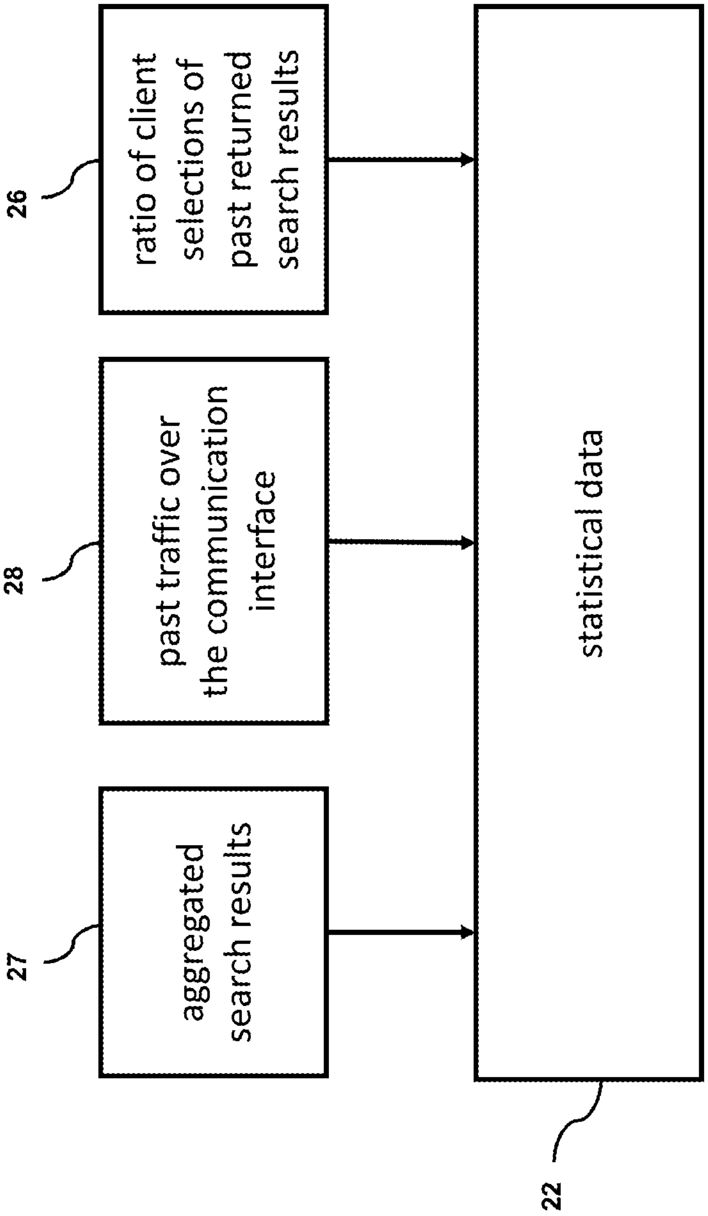
FIG. 6 illustrates statistical data as described herein.

In some embodiments and as shown in FIG. 6, the statistical data 22 is further based on aggregated search results 27 comprising at least one past search result based on data polled from the original data source and/or at least one past search result generated locally at the search platform 1; an amount of past traffic 28 over the communication interface 2 and/or the ratio of client selections 26 of past returned search results. This enables the provision of suitable statistical data 22 as a basis or optimizing the polling behavior within the distributed computing system. Referring to the example as described above, the aggregated search results 27 may comprise the search results generated for the US- and Japan-based clients 3, for which the search results get generated based on data polled from the original data source 4 as well as the search results for the Europe-based clients 3, for which the search results get generated locally at the search platform 1.

Also referring to the example as described above, the amount of the past traffic over the communication interface 2 may comprise the data exchanged through the polling of the original data source 4 by the search platform 1 in the case of US-based and Japan-based client search requests. According to embodiments, the amount of past traffic 28 over the communication interface 2 may be stored in corresponding traffic log data. In some embodiments, the traffic log data may comprise or may be comprised by the log data representing the history of polling decisions made by the search platform 1.

Referring further to the example as described above, the ratio 20 of client selections 26 of past returned search results (vs. non-selections of the past returned search results) may comprise the search result selections of the US-based, Japan-based and Europe-based clients 3. The ratio of the selections 26 for the US-based and Japan-based clients 3 may be higher in comparison with the ratio of the selections 26 for the European-based clients 3, since for the first ones, updated data polled from the original data source 4 have been used for the generation of the corresponding search results whereas for the latter ones (the European-based clients), search results generated at the search platform 1 have returned. For the search results generated at the search platform 1 for the Europe-based clients 3, cached data may have been used, which may be older and therefore have a probability of being outdated.

In some embodiments and as shown in FIG. 4, the polling control indicator 20 is determined based on the statistical data indicating a likelihood 30 of a client selection of at least one search result corresponding to the search request and/or results 31 of the determination whether to poll the original data source 4. This enables an optimal and flexible determination 11 whether to poll the original data source 4 (and therefore consume computation and transmission resources) based on client references and responses as well as on the data being requested by the search requests.

Referring again to the example as described within this disclosure, the likelihood 30 of a US-based client selection of at least one search result corresponding to the search request may be about 80%, and the corresponding likelihood 30 for a Japan-based client 3 may be 75%. Contrary, the corresponding likelihood 30 for a Europe-based client may be 55%, indicating that search results generated at the search platform 1 may be generated from potentially invalid cached data. Further, the results 31 of the determination whether to poll the data source 4 may indicate that for US-based and Japan-based clients 3, the data source 4 is polled for 80% of the corresponding search requests the data source 4 has been polled by the search platform 1, whereas for Europe-based client 3, the data source 4 has been polled for 60% of the corresponding search requests. As a consequence, the search requests of US-based and Japan-based clients 3 are attributed with a higher relevance and therefore with a higher priority, this contributing to the determination of the polling control indicator 20.

In some embodiments and as also shown in FIG. 4, the polling control indicator 20 is determined based on a degree of availability 33 to generate a search result locally. This enables to determine an alternative to polling the data source 4, in the case cached valid data for the generation of a search result is available. This further enables the reduction of the traffic/pressure load at the communication interface 2. If the cache at search platform 1 comprise valid earlier search results eligible for the generation of the search result for a current search request originating from client 3, or if the cache may comprise earlier search results that may be outdated but are nevertheless suited for the generation of valid search results, then the determination 11 may yield the results that polling the data source 4 is not necessary for the processing of the current search request of client 3 and the corresponding search results are instead generated locally at the search platform 1, even for a client 3 having a high polling level such as a "gold-class" US-client 3.

If, on the other hand, the cache at search platform 1 comprises potentially outdated search results that are eligible for the generation of the corresponding search result, but the validity of the corresponding search result generated at may be low and not suited for serving as response to the search request of the client 3, or when there may even be no eligible data in the cache of search platform 1 available for the generation of the search result, then this may indicate that, despite of a high traffic load currently occurring at the communication interface 2, a polling for said search request of e. g. a Europe-based client 3 may nevertheless be necessary, despite the requesting Europe-based client 3 being attributed only with a polling level of "bronze-class", and therefore ranging behind the US-based and Japan-based clients with respect to the polling priority for their search requests.

Figure 7:
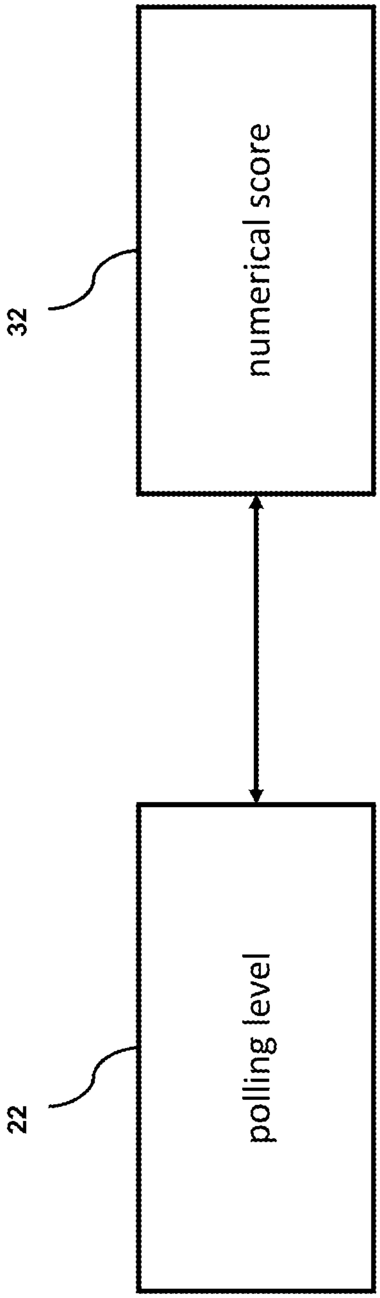
FIG. 7 depicts a numerical score for the polling indicator as described herein.

In some embodiments and as shown in FIG. 7, the polling level 22 is indicated by a numerical score 32. This provides a parameter for the validation whether to poll the original data source 4 for a client-based search request received at the search platform 1. In embodiments, the numerical score 32 may comprise a numerical scale, ranging e. g. from 0 to 1, with the value of "0" indicating no need to poll data source 4 and the value of "1" indicating the highest need to poll data source 4 for generating search results for a client-based search request. The determination of the numerical score 32 may be based on the maximal number of connections possible to the data source to be polled, such as data source 4, the current number of active connections to the data source to be polled (data source 4), the ratio of polling requests accepted by the data source 4 vs. those rejected.

Referring to the example as described above, the in the case of a traffic overload of 115% on the communication interface 2, the numerical score 32 may be 1 for the USA-based and Japan-based clients 3, since a polling is executed for their search requests, and 0 for the Europe-based clients 3, since their search requests are removed from polling. In the case there is currently no traffic overload at the communication interface 2, the search requests of all clients 3 may be attributed with a score of 1, meaning that there will be a polling for all search requests, regardless of the origin of the clients 3. On the other hand, scores between the values of 0 and 1 may be attributed to the various search requests in order to avoid a traffic overload at the communication interface 2. As an example, search requests from US-based clients 3 may be attributed a numerical score of 0.7, meaning that 7 out of 10 search requests will be polled at data source 4, search requests from Japan-based clients 3 will be attributed a numerical score of 0.6, meaning that 6 out of 10 search requests will be polled, and search request originating from Europe-based clients 3 will be attributed a numerical score of 0.4, meaning that 4 out of 10 search requests will be polled.

In addition, the numerical score 32 may provide a value indicating a probability whether future polling requests may be accepted by the original data source 4, therefore also providing a basis for the determination whether to poll the data source 4 at the very moment. If, as an example, a currently or recently determined numerical score 32 indicates a medium need to poll the data source 4, such as the numerical score for a Europe-based client 3 with having a value of 0.55, but the current traffic/polling pressure on the communication interface 2, as e. g. indicated by the load indicator 21, is low, meaning that there is currently a "good opportunity" to update the cached data used for the generation of search results for the Europe-based clients 3, then the numerical score for Europe-based clients 3 is temporarily set to 1 and the data source 4 may be polled at the current moment. This refreshes the cached data at search platform 1 relating to the search results for Europe-based clients 3 and also decreases the future traffic/polling pressure at data source 4, since the polling requests for the USA-based and Japan-based clients 3 do not have to concur with the polling requests for the Europe-based clients 3.

In some embodiments, the numerical score may be used for quantifying polling levels as indicated by the polling control indicator 20, e. g. a (sub-)range comprising numerical values from 0 to 50 may quantify the aforementioned "bronze-class", a (sub-)range covering values from 51 to 80 may quantify the "silver-class" and a (sub-)range ranging from 81 to 100 may quantify the "gold-class". This enables a definition of intuitive and user-friendly level designations, such as "gold-class", "high" etc. In embodiments, the quantification may be adapted, e. g. when a new polling level may be introduced, such as a "platinum-class".

Figure 8:
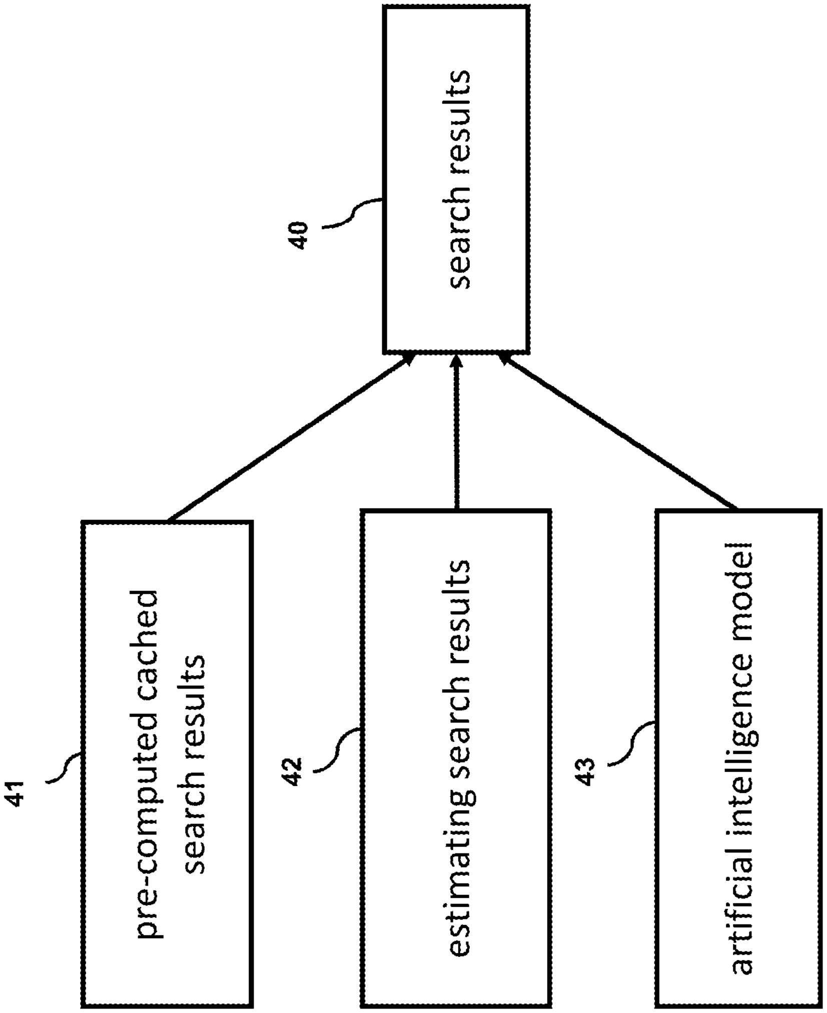
FIG. 8 shows the generation of a search result as described herein.

In some embodiments and as shown in FIG. 8, generating at least one search result 40 locally comprises at least one of utilizing a cache of pre-computed search results 41, estimating 42 at least one search result, utilizing a generative artificial intelligence model 43. This enables the generation of search results nevertheless being valid despite using cached data having a higher probability of being invalid in comparison with corresponding updated data retrieved from the data source 4.

Referring again to the example as described above, generating search results 40 in response to a search request from a Europe-based client 3 may comprise the utilization pf pre-computed search results 41 cached at e. g. the search platform 1, having been retrieved through an earlier polling of data source 4 in response to the reception of an earlier search request received at search platform 1 from a Europe-based client 3. Further, generating the search result for the search request from the Europe-based client 3 may comprise the estimation 42 of the search result 40, the estimation may be based on the cached pre-computed search results 41. In embodiments, the estimation 42 of the search results may comprise the utilization of a generative artificial intelligence model 43.

As already described within this disclosure for the determination of the current traffic 24 and/or the increase and/or decrease of the traffic 25, the generative artificial intelligence model 43 may also be based on neural networks and/or supervised learning and/or unsupervised learning and/or reinforcement learning and/or decision trees. The use of machine-learning based algorithms for the determination of the estimated search result 42 enables an efficient and optimized provision of a search result being valid despite being based on potentially older cached data instead on updated data polled from the original data source 4.

In some embodiments, the search results polled from data source 4 may also be cached at the search platform 1. The generation of a search result in response to a search request locally at the search platform 1 may therefore also comprise fresh, updated data from the data source 4. This may eliminate the need for polling the data source 4, even in the case the search request has been attributed a high polling level, such as "gold-class" or a numerical score of 1. In embodiments, the presence of updated data which has been polled from the data source 4 recently may also form the basis for the determination of the polling control indicator 20, indicating that an individual search request may not be responded by polling the data source 4 despite the requesting client 4 has been attributed with a high polling priority, such as a "gold-class" or a numerical value of 1 for the case of US-based clients 3.

On the other hand, the determination of the polling control indicator 20 may also be based on whether the generative artificial intelligence model 43 is sufficiently trained to provide valid search results which get generated locally at the search platform 1 by using cached data. Even if the cached data may be valid enough for providing a valid search result, the generative artificial intelligence model 43 may nevertheless lack the ability, due to its inaccuracy, to provide a valid estimation 42 for the search result. Therefore, a polling of the data source may be necessary even for search requests originating e. g. from a "bronze-class" client 3 in the case of a heavy traffic load occurring at the communication interface 2.

Figure 9:
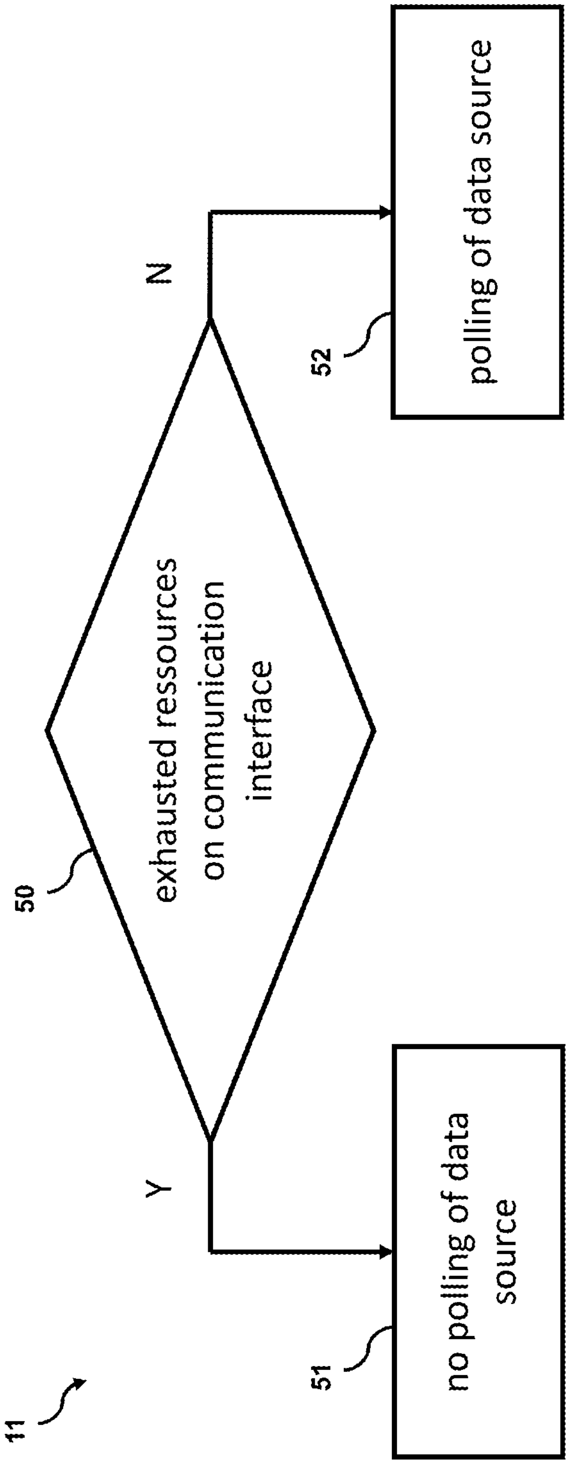
FIG. 9 illustrates a further flow/sequence for the determination whether to poll a data source as described herein.

In some embodiments and as shown in FIG. 9, determining 11 whether to poll the original data source may comprise in response to determining that the load indicator 21 indicates 50 exhausted resources on the communication interface 2, determining 51 not to poll the original data source 4 and in response to determining that the load indicator 21 indicates 50 available resources on the communication interface 2, evaluating 51 the polling control indicator 20 to determine whether to poll the original data source 4. This enables the additional basing of the polling decision on the current traffic load situation at the communication interface 2, and to generate a search result locally at the search platform 1 using cached data, instead of polling the data source 4, even in the case the polling level as indicated by the polling control indicator 20 is e. g. "high" or "gold-class".

To cite an example, the traffic load on the communication interface 2 may be near 100%, with this being exclusively caused by search requests from US-based clients 3, for which the data source 4 get polled. In the case a new group of further US-based clients 3 may begin to send additional search requests to search platform 1, these search requests, despite having a polling level of "gold-class" may not be responded with polled data from data source 4, but instead with search results generated from cached data from the search platform 1. On the other hand, if the traffic load on the communication interface 2 may be at 65%, then the search request from the new group of US-based clients 3 may be responded also by polling the data source 4.

Citing another example, the methodologies as described within this disclosure may be applied to search requests for open and usable, and therefore valid road connections between two or more locations. A road traffic information site acting as search platform 1 may receive, from one or more clients 3, search request for road connections. Based on the type of the road, a polling level indicated by the polling control indicator 20 may be determined. As an example, search request for connections involving highway roads may be attributed a polling level of "high" or 1 on a numerical scale 32, indication that such search requests will be most certainly polled, since the road traffic situation at a highway usually changes frequently during e. g. a day due to accidents, blocking vehicles, construction sites etc. Further, search requests for road connections within urban areas will be attributed with a polling level of "medium-to-high" or 0.95 on a numerical scale 32, since the road traffic situation within urban areas also changes on a frequent scale. Therefore, in order to generate valid search results as response to such search requests, corresponding updated and valid data relating to the current road traffic situation on highways and in urban areas may be polled from a data source 4, such as data servers providing road traffic data for a defined region, such as the State of New York or the Tokyo Metropolitan Region. Further, search requests received at search platform 1 relating to road connections in rural areas may be attributed a polling level of "low" or 0.4 on a numerical scale 32. Corresponding search request may be responded by using cached data stored at the search platform 1, since the road traffic situation in rural areas may not change frequently due to a low density of road traffic participants.

The determination 11 whether to poll the data source/server 4 may be based on the data traffic load on the communication interface 2 between the traffic information site/search platform 1 and the data source/server 4, as indicated by the load indicator 21. In the case the data traffic load indicated an overload of the communication interface 2, such as lying over the threshold of 100%, the determination 11 yields that search requests for rural connections, such as road connections in the State of Wyoming, are responded by generating search results based on cached data, whereas search requests relating to highway connections and road connections in rural areas will be responded by search results 60 polled from the data source/server 4.

Citing a further example, a travel shop for booking flights/search platform 1 may receive, e. g. over a New Distribution Channel (NDC), search requests for flight connections originating from the United Kingdom to the USA, to Japan and to Continental Europe. As described in the examples above, the polling level as indicated by the polling control indicator may be "high" or at a value of 1 on a numerical scale for search requests relating to flight connections to the USA, "medium-high" or at a numerical scale value of 0.95 for flight connections to Japan and "low" or at a numerical scale value of 0.4 for flight connections to Continental Europe. As already described for the example above, in the case of a traffic overload at the communication interface 2 between the travel shop for booking flights/search platform 1 and a data provider/source 4, the determination 11 of the corresponding search request would yield a polling for the flight connections to the USA and Japan and a generation of search results based on cached data stored at the travel shop for booking flights/search platform 1 for the flight connections to Continental Europe.

FIG. 10 is a diagrammatic representation of the internal components of a computing machine 100 implementing the functionality of search platform 1. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A display, an alphanumeric input device and a cursor control device may be provided as examples of user interface 102. The network interface device 103 connects the computing machine 100 implementing the user terminal 1 with the search platform 1.

Computing machine 100 includes a memory 106 such as main memory, random access memory (RAM) and/or any further volatile memory. The memory 106 may store temporary data and program data 107 to facilitate the functionality of the search platform 1, including program data to realize the receiving 10, from one of the plurality of clients 3, a search request.

In addition, the memory 106 may store temporary data and program data 107 to realize that, in response to receiving, in an activity 10, a search request from one of the plurality of clients 3, search platform 1 determines, in an activity 11 whether to poll the original data source 4 via the communication interface 2 based on a polling control indicator 20 and a load indicator 21. The polling control indicator 20 indicates a polling level for the search request determined by the search platform 1 and the load indicator 21 indicates an estimated current and future load on the communication interface 2. In response to determining 11 to poll the original data source, search platform 1 receives at least one search result for the search request based on data polled (activities 12-1, 12-2, 13-1, 13-2) from the original data source 4. In response to determining not to poll the original data source, search platform 1 generates, in activity 14, at least one search result for the search request locally at the search platform 1. As shown in FIGS. 2A, 2B, search platform 1 returns, in an activity 15, the at least one search result to the client 3.

A set of computer-executable instructions embodying any one, or all, of the methodologies described herein, resides completely, or at least partially, in or on a machine-readable storage medium, e.g., in the static memory 105 or, when loaded and being executed, in the main memory 106. For example, the instructions may include software processes implementing the search result processing functionality of the search platform 1. The instructions may further be transmitted or received as a propagated signal via the Internet through the network interface device 103 or via the user interface 102. Communication within computing machine 100 is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A method to process search requests at a search platform, the search platform being communicatively coupled to a plurality of clients as well as, via a communication interface, to an original data source, wherein resources over the communication interface are limited to a given threshold, the method comprising, at the search platform:

in response to receiving a search request from one of the plurality of clients, determining whether to poll the original data source via the communication interface based on a polling control indicator and a load indicator, wherein the polling control indicator is determined based on: a likelihood of a client selection of at least one search result corresponding to the search request; and a Quality-of-Service-level associated with the client from which the search request was received, wherein the polling control indicator indicates a polling level for the search request determined by the search platform and the load indicator indicates an estimated current and future load on the communication interface, wherein determining whether to poll comprises comparing the load indicator with a preset capacity target threshold of the communication interface and, when the load indicator exceeds the preset capacity target threshold but remains within a tolerance band of the load indicator, polling the original data source only when the polling control indicator indicates a high priority for the search request;

in response to determining to poll the original data source, generating at least one search result for the search request based on data polled from the original data source;

in response to determining not to poll the original data source, generating at least one search result for the search request locally at the search platform, wherein generating, at the search platform, at least one search result locally, further comprises at least one of utilizing a cache of the pre-computed search results, estimating at least one search result, and utilizing a generative artificial intelligence model;

returning the at least one search result to the client.

2. The method of claim 1, wherein the load indicator is determined based on statistical data representing polling decisions for past search requests and client feedback for search results from the plurality of clients.

3. The method of claim 2, wherein the load indicator is determined at the search platform by processing the statistical data to determine at least one of: an amount of current traffic over the communication interface, an estimation of future increase or decrease of the traffic over the communication interface, and a ratio of client selections of past returned search results.

4. The method of claim 2, further comprising determining, at the search platform, the statistical data based on:

aggregated search results comprising at least one past search result based on data polled from the original data source and/or at least one past search result generated locally at the search platform;

an amount of past traffic over the communication interface; and the ratio of client selections of past returned search results.

5. The method of claim 1, wherein the polling control indicator is determined based on the statistical data indicating a likelihood of a client selection of at least one search result corresponding to the search request and/or results of the determination whether to poll the original data source.

6. The method of claim 1, wherein the polling control indicator is determined based on a degree of availability to generate a search result locally.

7. The method of claim 1, wherein the polling level is indicated by a numerical score.

8. The method of claim 1, wherein determining whether to poll the original data source comprises:

in response to determining that the load indicator indicates exhausted resources on the communication interface, determining not to poll the original data source;

in response to determining that the load indicator indicates available resources on the communication interface, evaluating the polling control indicator to determine whether to poll the original data source.

9. A computing system comprising the computing platform, wherein the computing system is arranged to perform the method according to claim 1.

10. A non-transitory computer-readable storage medium storing instructions that, when executed by a processor, causes the computer to process operations of claim 1.

11. A system comprising a memory and a processor configured to perform operations of claim 1.

* * * * *